United States Patent
Masuta

(10) Patent No.: US 10,041,779 B2
(45) Date of Patent: Aug. 7, 2018

(54) SURFACE SHAPE MEASURING METHOD, MISALIGNMENT AMOUNT CALCULATING METHOD, AND SURFACE SHAPE MEASURING DEVICE

(71) Applicant: Tokyo Seimitsu Co., Ltd., Tokyo (JP)

(72) Inventor: Hikaru Masuta, Ibaraki (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 15/879,395

(22) Filed: Jan. 24, 2018

(65) Prior Publication Data

US 2018/0149457 A1    May 31, 2018

Related U.S. Application Data

(63) Continuation of application No. PCT/JP2016/069917, filed on Jul. 5, 2016.

(30) Foreign Application Priority Data

Aug. 27, 2015 (JP) .................... 2015-167972
Mar. 16, 2016 (JP) .................... 2016-052678
Mar. 31, 2016 (JP) .................... 2016-071002

(51) Int. Cl.
*G01B 5/10* (2006.01)
*G01B 3/22* (2006.01)
(Continued)

(52) U.S. Cl.
CPC ............. *G01B 3/22* (2013.01); *G01B 5/08* (2013.01); *G01B 5/10* (2013.01); *G01B 5/20* (2013.01)

(58) Field of Classification Search
CPC ............. G01B 5/10; G01B 5/20; G01B 5/201
(Continued)

(56) References Cited

U.S. PATENT DOCUMENTS 5,926,781 A * 7/1999 Scott ................... G01B 21/20
33/503
6,327,788 B1   12/2001 Seddon et al.
(Continued)

FOREIGN PATENT DOCUMENTS

CN   101055165 A   10/2007
EP   0409267 A1   1/1991
(Continued)

OTHER PUBLICATIONS

Tadao Tsukada et al., "A Study on Evaluation of Circularity and Related Features for Eccentric Cam Shaft," (2nd Report), JSPE-59, Mar. 1993, 6 pgs.

(Continued)

*Primary Examiner* — Christopher Fulton
(74) *Attorney, Agent, or Firm* — Morgan, Lewis & Bockius LLP

(57) ABSTRACT

There are provided a surface shape measuring method and a surface shape measuring device which can measure the diameter of a workpiece to be measured with high precision and high reproducibility and have excellent versatility. These method include: acquiring first shape data indicating a surface shape of the workpiece with a detector being disposed on one side across a workpiece while rotating the workpiece relatively to the detector around a rotational center; acquiring second shape data indicating the surface shape of the workpiece with the detector being disposed on the other side across the workpiece while rotating the workpiece relatively to the detector around the rotational center; and calculating a shape parameter defining the surface shape of the workpiece by collating the first shape data and second shape data. In calculating the shape parameter, a deviation of the detector from the reference line is calculated based on the collation result.

6 Claims, 15 Drawing Sheets

(51) Int. Cl.
*G01B 5/20* (2006.01)
*G01B 5/08* (2006.01)

(58) Field of Classification Search
USPC .......................................... 33/549, 550, 551
See application file for complete search history.

(56) References Cited

U.S. PATENT DOCUMENTS

| | | | | |
|---|---|---|---|---|
| 6,427,353 | B1* | 8/2002 | Nelson | G01B 5/00 |
| | | | | 33/542 |
| 7,918,036 | B2* | 4/2011 | Ishikawa | G01B 5/28 |
| | | | | 33/503 |
| 8,949,071 | B2* | 2/2015 | Takanashi | G01B 5/201 |
| | | | | 33/502 |
| 8,991,246 | B2* | 3/2015 | Hirono | G01B 5/008 |
| | | | | 33/503 |
| 9,581,424 | B2* | 2/2017 | Takanashi | G01B 5/201 |
| 2003/0164699 | A1 | 9/2003 | DeBlock et al. | |
| 2005/0132591 | A1 | 6/2005 | Kojima et al. | |
| 2006/0085995 | A1* | 4/2006 | Katamachi | G01B 5/0016 |
| | | | | 33/550 |
| 2006/0101660 | A1* | 5/2006 | Takanashi | G01B 5/0002 |
| | | | | 33/503 |
| 2012/0185210 | A1 | 7/2012 | Takanashi | |
| 2015/0082651 | A1* | 3/2015 | Yeh | G01B 5/10 |
| | | | | 33/831 |
| 2015/0377617 | A1* | 12/2015 | Ould | G01B 21/04 |
| | | | | 702/168 |

FOREIGN PATENT DOCUMENTS

| | | |
|---|---|---|
| JP | H01-259211 A | 10/1989 |
| JP | H11-063971 A | 3/1999 |
| JP | 2000-501505 A | 2/2000 |
| JP | 2005-037353 A | 2/2005 |
| JP | 2012-058057 A | 3/2012 |
| JP | 2012-145494 A | 8/2012 |
| JP | 2012-154942 A | 8/2012 |
| JP | 2015-068740 A | 4/2015 |
| WO | WO1997/021076 A1 | 6/1997 |

OTHER PUBLICATIONS

Tokyo Seimitsu Co. Ltd., Notification of Reasons for Refusal, JP 2016-133413, dated Jul. 28, 2016, 7 pgs.
Tokyo Seimitsu Co. Ltd., Notification of Reasons for Refusal, JP 2016-208440, dated Nov. 9, 2016, 9 pgs.
Tokyo Seimitsu Co. Ltd., Notification of Reasons for Refusal, JP 2017-011142, dated Feb. 8, 2017, 7 pgs.
Tokyo Seimitsu Co. Ltd., International Preliminary Report on Patentability, PCT/JP2016/069917, dated Feb. 27, 2017, 4 pgs.

* cited by examiner

SURFACE SHAPE MEASURING METHOD, MISALIGNMENT AMOUNT CALCULATING METHOD, AND SURFACE SHAPE MEASURING DEVICE

CROSS-REFERENCE TO RELATED APPLICATIONS

This application is a Continuation of PCT International Application No. PCT/JP2016/069917 filed on Jul. 5, 2016, which claims priorities under 35 U.S.C. § 119(a) to Japanese Patent Application No. 2015-167972 filed on Aug. 27, 2015, Japanese Patent Application No. 2016-052678 filed on Mar. 16, 2016 and Japanese Patent Application No. 2016-071002 filed on Mar. 31, 2016. Each of the above application(s) is hereby expressly incorporated by reference, in its entirety, into the present application.

BACKGROUND OF THE INVENTION

Field of the Invention

The present invention relates to a technology of measuring a surface shape of a workpiece by detecting a displacement of a surface of the workpiece by a detector while relatively rotating the workpiece and the detector around a rotational center.

Description of the Related Art

Conventionally, as a surface shape measuring device which measures a surface shape of a workpiece (object to be measured), there is known a roundness measuring device which measures roundness or the like of the workpiece (for example, see PTL 1).

In a roundness measuring device disclosed in PTL 1, a rotary table is provided on a main body base (stage), a column is stood on the main body base, and a carriage (sliding body) is provided on the column so as to be freely movable in the vertical direction (upward and downward direction). An arm (horizontal arm) is supported on the carriage so as to be freely movable in a horizontal direction, and a first detector is provided at a tip of the arm. The first detector has a probe (contactor) that comes into contact with the surface of a workpiece, and detects a displacement of the probe by a differential transformer. Moreover, a second detector that detects a movement amount of the arm in the horizontal direction is provided on the carriage.

When measuring the roundness of a workpiece using this roundness measuring device, the workpiece is placed on the rotary table such that the center of a measuring portion of the workpiece (hereinafter referred to as "workpiece center") substantially coincide with the rotational axis center (rotational center) of the rotary table. Then, for the probe coming into contact with the surface (measuring surface) of the workpiece, the carriage is moved to adjust its vertical directional position, and the arm is moved to adjust its horizontal direction position. By detecting a displacement of the probe in contact with the surface of the workpiece by the first detector while rotating the rotary table in this state, surface shape data of the workpiece is acquired to calculate the roundness or the like of the workpiece.

Moreover, PTL 1 discloses a diameter measuring method of a workpiece with the roundness measuring device. In this diameter measuring method, first, a master workpiece is placed on the rotary table, the probe of the first detector is brought into contact with a right lateral surface of the master workpiece to acquire an output of the second detector. Next, the probe is brought into contact with a left lateral surface of the master workpiece to acquire an output of the second detector, a measured diameter of the master workpiece which is the difference between the outputs of the second detector is obtained, and the difference between the measured diameter of the master workpiece and a known diameter of the master workpiece is set as a correction value. Then, placing a workpiece which is a measuring object (object to be measured) on the rotary table in place of the master workpiece, and a measured diameter of the workpiece is obtained by a similar measurement method used for the master workpiece. Then, a corrected diameter which is the true diameter of the workpiece is calculated by subtracting the aforementioned correction value from the measured diameter of the workpiece.

Moreover, PTL 2 discloses a roundness measuring device which measures a roundness, a degree of cylindricity or the like of a workpiece (measuring object). In PTL 2, a probe of a detector is brought into contact with a surface of the workpiece placed on a table, the detector is relatively rotated with respect to the workpiece by rotating the table or the detector, and a displacement of the probe which is in contact with the surface of the workpiece is detected with the detector.

When measuring the diameter of the workpiece using such a roundness measuring device, in order to grasp an accurate distance from a rotational center (rotational axis center) which is a center of relative rotation of the workpiece and the detector to a detection point (position at which the probe comes into contact with the workpiece), it is needed that after performing calibration with a reference workpiece (reference measuring object) whose diameter is known, the diameter of the workpiece is measured. Moreover, in the case where temperature is changed after the calibration, it is needed that calibration using the reference workpiece is redone since the distance from the rotational center to the detection point is displaced.

Moreover, there is a problem that when the diameter of the reference workpiece used for the calibration is different from the diameter of the workpiece to be measured, an error occurs due to a deviation of the detection point relative to a measurement generating line, and measurement precision of the diameter is degraded. Note that in the specification, the "measurement generating line" is a straight line that passes through the rotational center and is parallel to the displacement direction of the probe. Moreover, the deviation of the detection point relative to the measurement generating line is referred to as a "misalignment", and the deviation amount (distance between the measurement generating line and the detection point) in this time is referred to as a "misalignment amount". Moreover, an error of the probe in the displacement direction (direction parallel to the measurement generating line) caused by the misalignment, that is, an error in detection value derives from the detector, is referred to as a "measurement error".

Considering such a problem, PTL 2 discloses a method in which measurements are performed at respective two opposite detection points on the reference measuring object by moving the detector relative to the reference workpiece whose diameter is known in the direction parallel to the measurement generating line, and then the misalignment amount is calculated based on the difference between the measurements. According to this method, the diameter of the workpiece measured by the roundness measuring device can be corrected based on the misalignment amount. Accordingly, regardless of the misalignment amount of the roundness measuring device, the accurate diameter can be calculated even for a workpiece having a diameter different from a diameter of a reference workpiece.

CITATION LIST

Patent Literature

PTL 1: Japanese Patent Application Laid-Open No. 1-259211
PTL 2: Japanese Patent Application Laid-Open No. 2012-145494

SUMMARY OF THE INVENTION

However, while in the diameter measuring method disclosed in PTL 1, the measurements are performed by bringing the probe into contact with the workpiece at two points opposite to each other in the diameter direction (radial direction perpendicular to the rotational axis center of the rotary table), the measurements without rotation of the workpiece merely afford data for only the two points. Therefore, when an imperfectly circular object is measured, the true value (diameter) cannot be obtained by the measurement and this may cause a large measurement error. In particular, when the workpiece has low roundness, the measurement results tend to vary depending on the direction in which the diameter of the workpiece is measured (the position at which the probe is brought into contact with the workpiece), and it is difficult to measure the diameter of the workpiece with high precision and high reproducibility. Thus, the method disclosed in PTL 1 is poor in versatility.

Moreover, in the misalignment amount calculating method disclosed in PTL 2, because measurement using the reference workpiece is essential for calculating the misalignment amount of the roundness measuring device, there is a problem that measurement operation is complicated and burdensome.

Moreover, in the misalignment amount calculating method disclosed in PTL 2, while the misalignment amount of the roundness measuring device can be calculated by using the reference workpiece, its premise is that the reference workpiece is measured with high dimensional precision. However, when the dimension of the reference workpiece is changed due to abrasion caused by its uses, there is a problem that an error occurs in calculating the misalignment amount, and the surface shape of the workpiece cannot be obtained with excellent precision. As a result, this adversely affects on measurement precision of the diameter of the workpiece.

The present invention is devised in view of such circumstances, and aims to provide a surface shape measuring method, a misalignment amount calculating method and a surface shape measuring device which can measure the surface shape of a workpiece with high precision and high measurement reproducibility, and have excellent versatility.

In order to achieve the aforementioned object, according to a first aspect of the present invention, a surface shape measuring method of measuring a surface shape of a workpiece by detecting a displacement of a surface of the workpiece with a detector while rotating the workpiece relatively to the detector around a rotational center, includes: a first shape data acquiring step of acquiring first shape data with the detector being disposed on one side with respect to the workpiece, the first shape data indicating the surface shape of the workpiece when detecting a displacement of the surface of the workpiece with the detector while rotating the workpiece relatively to the detector around the rotational center; and a second shape data acquiring step of acquiring second shape data with the detector being disposed on the other side with respect to the workpiece, the second shape data indicating the surface shape of the workpiece when detecting a displacement of the surface of the workpiece with the detector while relatively rotating the workpiece and the detector around the rotational center.

According to a second aspect of the present invention, the surface shape measuring method of the first aspect includes a shape parameter calculating step of collating the first shape data and the second shape data with each other, and based on a result of the collation, calculating a shape parameter defining the surface shape of the workpiece.

According to a third aspect of the present invention, in the surface shape measuring method of the second aspect, the shape parameter is a diameter of the workpiece.

According to a fourth aspect of the present invention, in the shape parameter calculating step in the surface shape measuring method of the third aspect, the diameter of the workpiece is calculated by averaging processing on a first diameter of the workpiece calculated based on the first shape data and a second diameter of the workpiece calculated based on the second shape data.

According to a fifth aspect of the present invention, the surface shape measuring method of the first aspect includes an evaluating step of collating the first shape data and the second shape data with each other, and based on a result of the collation, evaluating measurement precision of the surface shape of the workpiece.

According to a sixth aspect of the present invention, a misalignment amount calculating method in the surface shape measuring method of any one of the first aspect to the fifth aspect which detects a displacement of a probe in contact with the surface of the workpiece with the detector while rotating the workpiece relatively to the detector around the rotational center, the misalignment amount calculating method includes a misalignment amount calculating step of collating the first shape data and the second shape data with each other, and calculating a misalignment amount indicating a distance from a detection point to a measurement generating line based on a result of the collation, where the measurement generating line indicates a straight line that passes through the rotational center and is parallel to a displacement direction of the probe, and the detection point indicates a position at which the probe comes into contact with the workpiece.

In a misalignment amount calculating method according to a seventh aspect of the present invention, the misalignment amount calculating step includes: performing phase inverting processing of shifting a phase of one of the first shape data and the second shape data by 180 degrees relative to a phase of the other of the first shape data and the second shape data; calculating a divergence angle between the first shape data and the second shape data after the phase inverting processing; and calculating the misalignment amount based on the divergence angle.

A misalignment amount calculating method according to an eighth aspect of the present invention includes a misalignment determining step of comparing the misalignment amount calculated in the misalignment amount calculating step with a preset reference value, determining that misalignment does not exist when the misalignment amount is not more than the reference value, and determining that misalignment exists when the misalignment amount exceeds the reference value.

A surface shape measuring device according to a ninth aspect of the present invention which measures a surface shape of a workpiece by detecting a displacement of a surface of the workpiece with a detector while rotating the workpiece relatively to the detector around a rotational center, the device includes: a first shape data acquiring unit configured to acquire first shape data with the detector being disposed on one side with respect to the workpiece, the first shape data indicating the surface shape of the workpiece when detecting a displacement of the surface of the workpiece with the detector while rotating the workpiece relatively to the detector around the rotational center; and a second shape data acquiring unit configured to acquire second shape data with the detector being disposed on the other side with respect to the workpiece, the second shape data indicating the surface shape of the workpiece when detecting a displacement of the surface of the workpiece with the detector while rotating the workpiece relatively to the detector around the rotational center.

According to a tenth aspect of the present invention, the surface shape measuring device of the ninth aspect includes a shape parameter calculating unit configured to collate the first shape data and the second shape data with each other, and calculate a shape parameter defining the surface shape of the workpiece based on a result of the collation.

According to an eleventh aspect of the present invention, in the surface shape measuring device of the tenth aspect, the shape parameter is a diameter of the workpiece.

According to a twelfth aspect of the present invention, in the surface shape measuring device of the eleventh aspect, the shape parameter calculating unit calculates the diameter of the workpiece by averaging processing on a first diameter of the workpiece calculated based on the first shape data and a second diameter of the workpiece calculated based on the second shape data.

According to a thirteenth aspect of the present invention, the surface shape measuring device of the ninth thirteenth aspect includes an evaluating unit configured to collate the first shape data and the second shape data with each other, and evaluate measurement precision of the surface shape of the workpiece based on a result of the collation.

According to a fourteenth aspect of the present invention, in any one of the ninth aspect to the thirteenth aspect, the surface shape measuring device is a device which detects a displacement of a probe in contact with the surface of the workpiece with the detector while rotating the workpiece relatively to the detector around the rotational center, and the surface shape measuring device comprises a misalignment amount calculating unit configured to collate the first shape data and the second shape data with each other, and calculate a misalignment amount indicating a distance from the detection point to a measurement generating line based on a result of the collation, where the measurement generating line indicates a straight line that passes through the rotational center and is parallel to a displacement direction of the probe, and the detection point indicates a position at which the probe comes into contact with the workpiece.

According to a fifteenth aspect of the present invention, in the surface shape measuring device of the fourteenth aspect, the misalignment amount calculating unit performs phase inverting processing of shifting a phase of one of the first shape data and the second shape data by 180 degrees relative to a phase of the other of the first shape data and the second shape data, calculates a divergence angle between the first shape data and the second shape data after the phase inverting processing, and calculates the misalignment amount based on the divergence angle.

According to a sixteenth aspect of the present invention, the surface shape measuring device of the fourteenth aspect or the fifteenth aspect includes a misalignment determining unit configured to compare the misalignment amount calculated by the misalignment amount calculating unit with a preset reference value, determine that misalignment does not exist when the misalignment amount is not more than the reference value, and determine that misalignment exists when the misalignment amount exceeds the reference value.

According to the present invention, it is possible to measure a surface shape of a workpiece with high precision and high reproducibility. In addition, the measurement is excellent in versatility.

DETAILED DESCRIPTION OF THE EMBODIMENTS

Hereafter, preferred embodiments of the present invention are described with reference to the appended drawings.

First Embodiment

First, a first embodiment is described.

Figure 1:
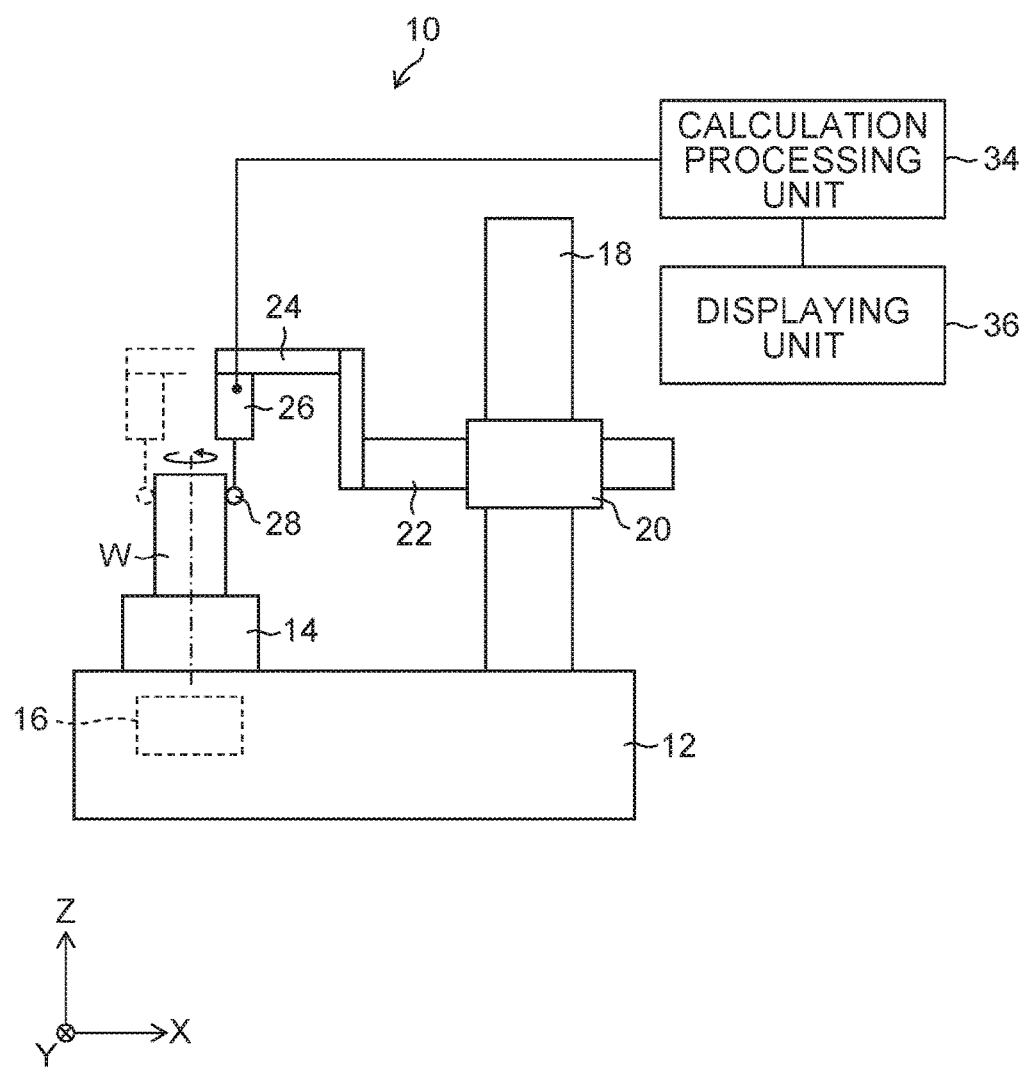
FIG. 1 is a schematic diagram showing a roundness measuring device according to a first embodiment.

FIG. 1 is a schematic diagram showing a roundness measuring device 10 according to the first embodiment. As shown in FIG. 1, the roundness measuring device 10 according to the first embodiment includes a rotary table (turn table) 14 on which a workpiece (measuring object) W is placed on a main body base (base stage) 12. The rotary table 14 is configured to be finely fed (inched) in an X-direction and in a Y-direction with an X-direction fine movement knob (not shown) and a Y-direction fine movement knob (not shown). The inclination of the rotary table 14 is adjusted in the X-direction and in the Y-direction with an X-direction inclining knob (not shown) and a Y-direction inclining knob (not shown).

Note that the X-direction, the Y-direction and a Z-direction are directions perpendicular to each other, the X-direction is a horizontal direction (corresponding to the movement direction of an arm 22 mentioned later), the Y-direction is the horizontal direction perpendicular to the X-direction, and the Z-direction is the vertical direction (movement direction of a carriage 20 mentioned later).

The rotary table 14 is rotatably supported by a motor (rotary driving unit) 16 via a bearing (not shown). To a rotary shaft of the motor 16, a rotary encoder (not shown) constituting a rotational angle detecting unit 62 mentioned later (see FIG. 2) is attached, and the rotary encoder is configured to read a rotational angle in with high precision. For the bearing, for example, a hydrostatic air bearing with super high precision is used, and the rotary table 14 is rotated with very high rotational precision (for example, 0.005 μm). The rotational angle detecting unit 62 (rotary encoder) is an example of means (rotational angle detecting means) that detects a rotational angle of the workpiece W, and detects the rotational angle of the workpiece W placed on the rotary table 14 by detecting the rotational angle of the motor 16. A detection signal (rotational angle data) output from the rotational angle detecting unit 62 (rotary encoder) is input to a calculation processing unit 34 mentioned later. Note that the rotational angle detecting means is not limited to the rotary encoder. For example, the rotational angle of the workpiece W may be detected based on information about a drive signal (pulse number) of the motor 16 driving the rotary table 14.

On the main body base 12, a column (support strut) 18 extending in the vertical direction (Z-direction) is stood, and on the column 18, the carriage 20 is supported freely movably in the vertical direction (Z-direction). On the carriage 20, the arm (radial directional movement axis) 22 is supported freely movably in one horizontal axis direction (X-direction). A detector holder 24 is attached to the tip of the arm 22. A detector 26 is attached to the tip of the detector holder 24. For the detector 26, an electric micrometer using a differential transformer is used, and the detector 26 detects a displacement amount of a probe 28 which is in contact with the surface of the workpiece W.

The detector 26 includes a bidirectional detector having a bidirectional (both of rightward and leftward directions in FIG. 1) detection function in the radial direction (X-direction) perpendicular to the rotational axis center of the rotary table 14. Specifically, the detector 26 has an urging member for urging the probe 28 bidirectionally in the X-direction. The detector 26 holds parallelism at the center of its displaceable range, outputs a value of 0 (zero) at this center position, outputs a positive value when the probe 28 is displaced, for example, rightward in FIG. 1, and outputs a negative value when the probe 28 is displaced leftward. The configuration of such a bidirectional detector is known (for example, see PTL 1), and its detailed description is omitted here.

Here, while in the embodiment, a configuration in which the detector 26 includes a bidirectional detector is presented as one of preferred modes, the configuration is not limited to this. The detector 26 may include a single-directional detector having a detection function for only one direction. In this case, it is sufficient that the orientation of the detector 26 is changed in accordance with the direction (orientation) in which the probe 28 is brought into contact with the surface (measuring surface) of the workpiece W.

The position of the detector 26 (the X-directional position and the Z-directional position) can be detected by a detector position detecting unit 60 mentioned later (see FIG. 2). The detector position detecting unit 60 is configured to include an X-axis linear encoder (not shown) that detects the position of the arm 22 which moves the detector 26 in the X-direction, and a Z-axis linear encoder (not shown) that detects the position of the carriage 20 which moves the detector 26 in the Z-direction. Detection signals (detector position data) respectively output from the X-axis linear encoder and the Z-axis linear encoder are input to the calculation processing unit 34 mentioned later. Thus, the calculation processing unit 34 can grasp the position of the detector 26 (the X-directional position and the Z-directional position) from the detector position data detected by the X-axis linear encoder and the Z-axis linear encoder when calculating shape parameters such as the diameter, the degree of cylindricity, and the degree of coaxiality of the workpiece W.

Here, detecting means of detecting the position of the detector 26 is not limited to the linear encoders. The position of the detector 26 may be detected by a rotary encoder via a mechanism that converts the linear movement of the detector 26 (arm 22) into rotary motion. Moreover, the detection system of the encoder is not specially limited and various systems such as an optical system, a magnetic system, a laser system, a mechanical system and a capacitance system can be employed. Moreover, detecting means is not limited to an encoder. As long as detecting means can detect the position of the detector 26, detecting means with any other configuration can be employed.

When measuring the roundness or the like of the workpiece W by the roundness measuring device 10 of the embodiment, after the workpiece W is placed on the rotary table 14, first, eccentricity correction between the rotational center of the rotary table 14 and the center of the workpiece W, and inclination correction of the workpiece W relative to the rotary table 14 are performed.

Next, the rotary table 14 is rotated by one rotation with the motor 16 in the state where the probe 28 of the detector 26 is in contact with the surface (lateral surface) of the workpiece W, and data of the surface of the workpiece W for the one rotation is obtained. The detection signal (displacement data) output from the detector 26 is input to the calculation processing unit 34. The roundness or the like of the workpiece W is obtained by calculation processing from the rotational angle data input from the rotary encoder and the displacement data input from the detector 26 in the calculation processing unit 34, and the calculation processing result is displayed on a displaying unit 36.

Here, as mentioned later in detail, in the roundness measuring device 10 according to the first embodiment, the calculation processing unit 34 has a function of performing various calculation functions for measuring the diameter of the workpiece W with high precision and high reproducibility.

Figure 2:
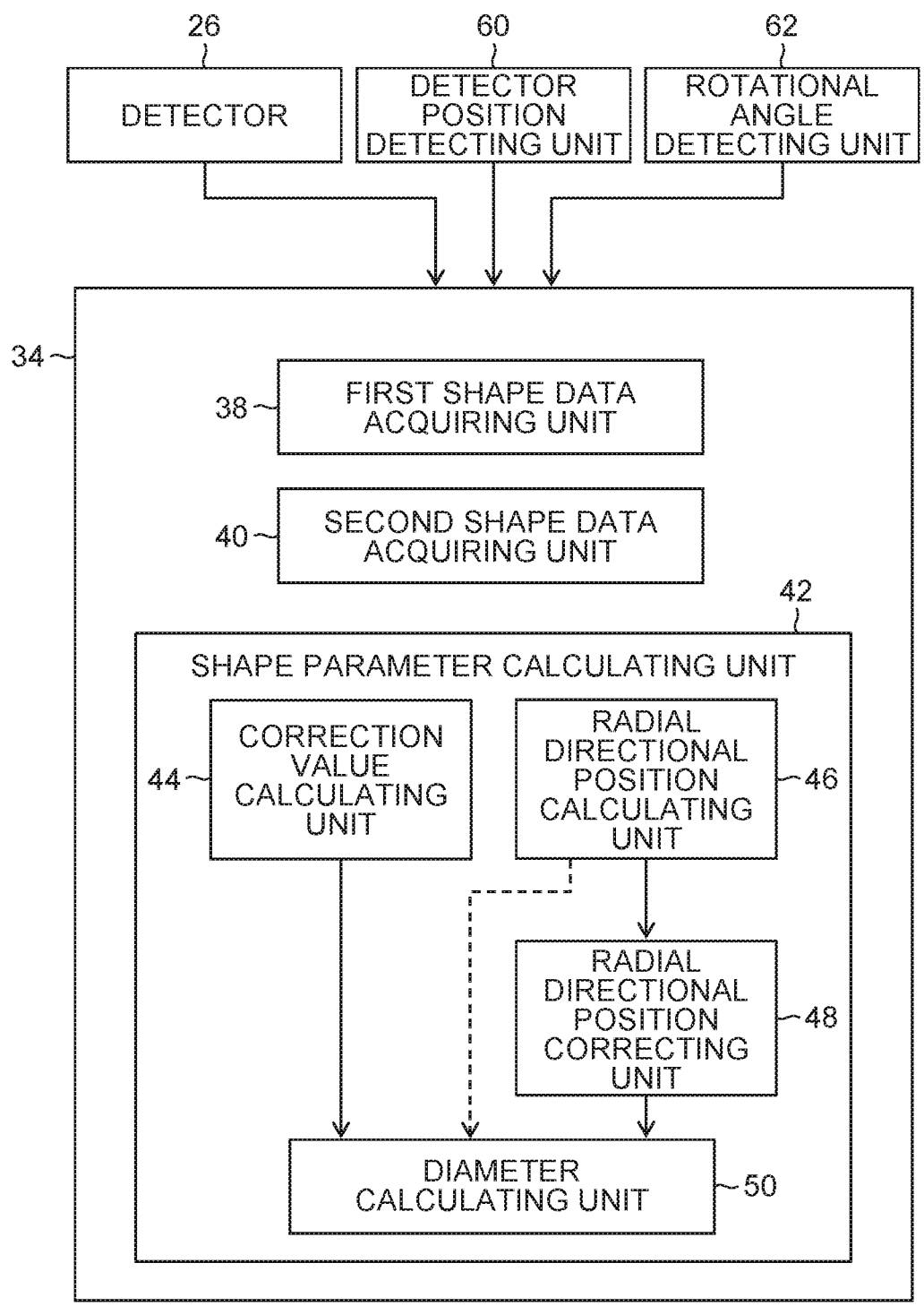
FIG. 2 is a block diagram of the roundness measuring device according to the first embodiment.

FIG. 2 is a functional block diagram showing a functional configuration of the calculation processing unit 34. As shown in FIG. 2, the detection signal (displacement data) output from the detector 26, the detection signal (detector position data) output from the detector position detecting unit 60 (the X-axis linear encoder and the Z-axis linear encoder), and the detection signal (rotational angle data) output from the rotational angle detecting unit 62 (rotary encoder) are input to the calculation processing unit 34.

For performing the aforementioned various kinds of calculation processing, the calculation processing unit 34 operates as the following functional units. Namely, the calculation processing unit 34 functions as a first shape data acquiring unit 38, a second shape data acquiring unit 40, a shape parameter calculating unit 42 and the like.

The first shape data acquiring unit 38 acquires first shape data indicating a surface shape (measurement sectional shape) of the workpiece W when measurement is performed in the state where the probe 28 is brought into contact with the surface of the workpiece W from one side with respect to the workpiece W.

The second shape data acquiring unit 40 acquires second shape data indicating a surface shape (measurement sectional shape) of the workpiece W when measurement is performed in the state where the probe 28 is brought into contact with the surface of the workpiece W from the other side with respect to the workpiece W.

The shape parameter calculating unit 42 collates the first shape data and the second shape data with each other, and based on the result of the collation, calculates a shape parameter (for example, the diameter of the workpiece W) defining the surface shape of the workpiece W.

The shape parameter calculating unit 42 includes a correction value calculating unit 44, a radial directional position calculating unit 46, a radial directional position correcting unit 48 and a diameter calculating unit 50.

The correction value calculating unit 44 obtains, as a correction value (calibration value), a difference between a measured diameter when measuring the diameter of the master workpiece by the roundness measuring device 10 and a known diameter of a master workpiece.

The radial directional position calculating unit 46 calculates a radial directional position of the surface of the workpiece W (distance from the workpiece center to the workpiece surface) based on the first shape data and the second shape data respectively acquired by the first shape data acquiring unit 38 and the second shape data acquiring unit 40.

The radial directional position correcting unit 48 corrects the radial directional position of the surface of the workpiece W calculated by the radial directional position calculating unit 46.

The diameter calculating unit 50 calculates the diameter of the workpiece W based on the corrected radial directional position of the surface of the workpiece W corrected by the radial directional position correcting unit 48, and further corrects the diameter of the workpiece W based on the correction value calculated by the correction value calculating unit 44.

Next, a measuring method of the surface shape of the workpiece W using the roundness measuring device 10 according to the first embodiment is described. This surface shape measuring method is an example of a surface shape measuring method according to the present invention, and enables measurement of the surface shape of the workpiece W with high precision and high reproducibility and measurement thereof also high in versatility. Specifically, as mentioned later in detail, the detector 26 is disposed on one side with respect to the workpiece W, and the first shape data is obtained. The first shape data indicates the surface shape of the workpiece W when a displacement of the surface of the workpiece W is detected by the detector 26 while rotating the workpiece W relatively to the detector 26 around a rotational center. In addition, the detector 26 is disposed on the other side with respect to the workpiece W, and the second shape data is obtained. The second shape date indicates the surface shape of the workpiece W when a displacement of the surface of the workpiece W is detected by the detector 26 while rotating the workpiece W relatively to the detector 26 around the rotational center. Then, the first shape data and the second shape data are collated with each other, and the diameter of the workpiece W is obtained based on the result of the collation. The diameter of the workpiece W is an example of the shape parameter defining the surface shape of the workpiece W.

Figure 3:
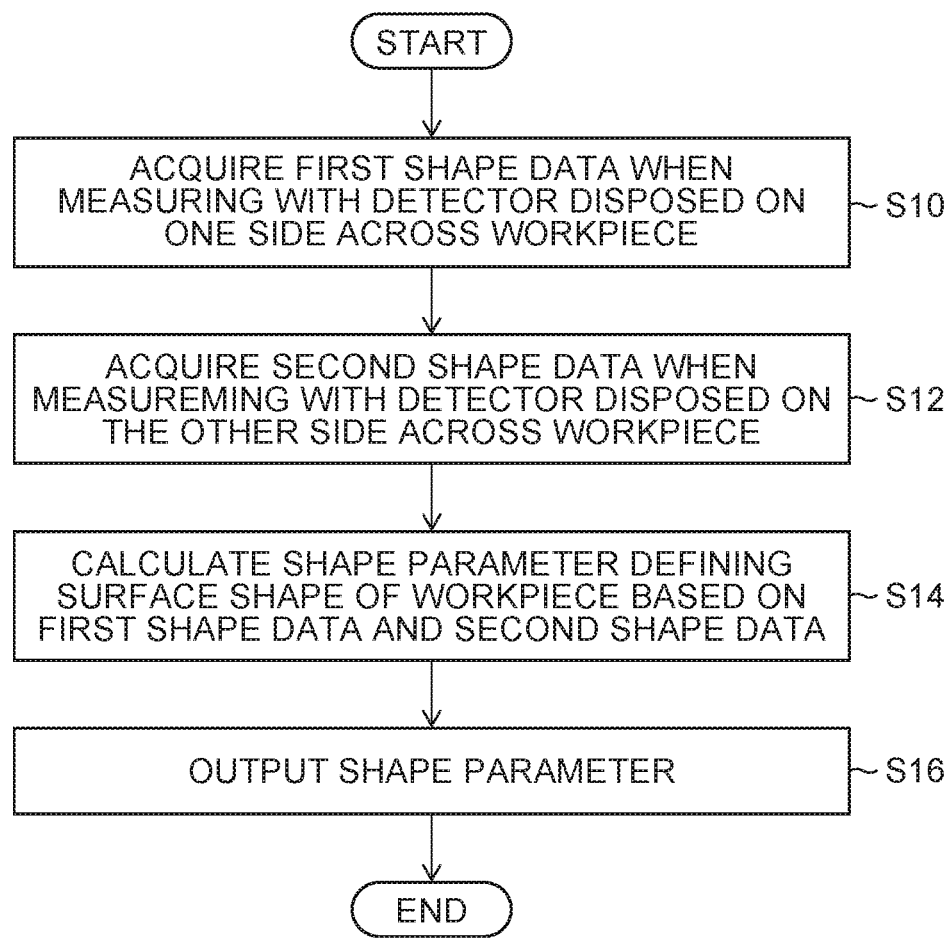
FIG. 3 is a flowchart showing a flow of a diameter measuring method of a workpiece with the roundness measuring device according to the first embodiment.

FIG. 3 is a flowchart showing a flow of the measuring method of the surface shape of the workpiece W using the roundness measuring device 10 according to the first embodiment. FIG. 4A to FIG. 4E are diagrams for explaining processing shown in the flowchart of FIG. 3. Note that it is supposed that at the start of the flowchart shown in FIG. 3, the workpiece W is placed on the rotary table 14 such that the center of the workpiece W substantially coincides with the rotational center of the rotary table 14, and eccentricity correction (centering adjustment) and inclination correction (tilting adjustment) have been performed as needed.

First, before measurement of the workpiece (workpiece to be measured) W which is a measuring object, processing for calibrating the X-axis linear encoder of the detector position detecting unit 60 is performed.

Figure 4A:
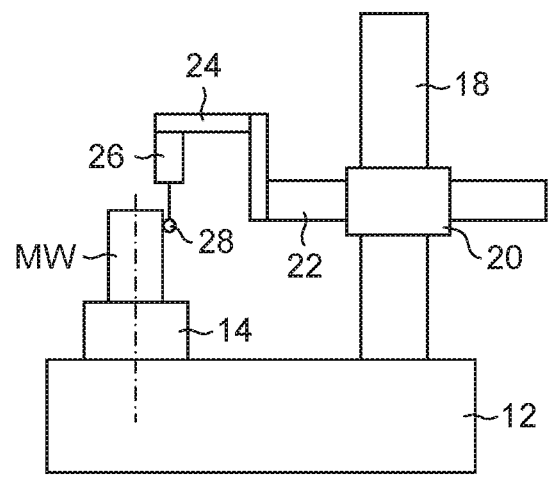
FIG. 4A is a diagram for explaining the processing shown in the flowchart of FIG. 3.
Figure 4B:
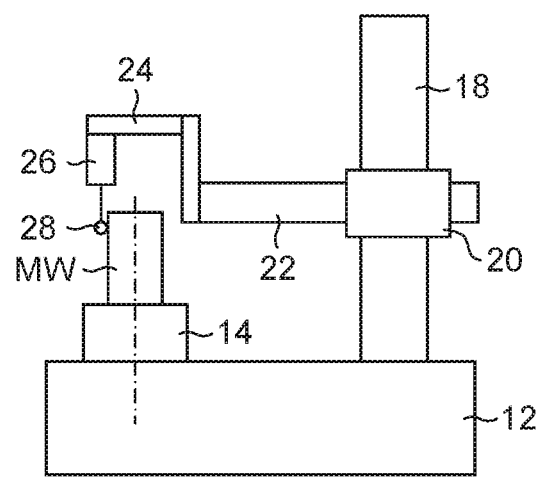
FIG. 4B is a diagram for explaining the processing shown in the flowchart of FIG. 3.

Specifically, first, a master workpiece (reference workpiece) MW having a known diameter is prepared, and the master workpiece MW is placed on the rotary table 14. Then, after adjusting its eccentricity such that the center (workpiece center) of the workpiece precisely coincides with the rotational center of the rotary table 14, as shown in FIG. 4A, the arm 22 is moved in the X-direction such that the probe 28 comes into contact with the surface of the master workpiece MW on one side (0-degree position) in the X-direction. Then, the calculation processing unit 34 acquires an X-directional position r1 of the detector 26 from the detector position detecting unit 60 when the output of the detector 26 indicates a value "+α (α>0)" displaced from the origin point (origin) toward the positive side (rightward in the figure). Next, as shown in FIG. 4B, the detector 26 is moved to the opposite side relative to the master workpiece MW, and the arm 22 is moved in the X-direction such that the probe 28 comes into contact with the surface of the master workpiece MW on the other side (180-degree position) in the X-direction. Then, the calculation processing unit 34 acquires an X-directional position r2 of the detector 26 from the detector position detecting unit 60 when the output of the detector 26 indicates a value "−α" displaced from the origin point toward the negative side.

Note that the X-directional position of the detector 26 detected by the detector position detecting unit 60 (X-axis linear encoder) is indicated in such a manner that, with the rotational center (workpiece center) of the rotary table 14 being as the reference position (origin), the right side of the reference position is a positive side and the left side of the reference position is a negative side in FIG. 1.

Next, the calculation processing unit 34 functions as the correction value calculating unit 44 of the shape parameter calculating unit 42, and obtains "d1=|r1−r2|" which is the measured diameter of the master workpiece MW from the X-directional positions r1 and r2 of the detector 26 acquired as above. Then, the calculation processing unit 34 sets "e=d1−d0=|r1−r2|−d0" which is the difference between the measured diameter d1 of the master workpiece MW and the known diameter d0 of the master workpiece MW as the correction value (calibration value), and stores the correction value in a not-shown storage unit. Thereby, the diameter calculating unit 50 mentioned later can correct (calibrate) measurement of the diameter of the workpiece W using the correction value stored in the storage unit.

(Step S10: First Shape Data Acquiring Step)

After the aforementioned processing completed, a first shape data acquiring step is performed.

Figure 4C:
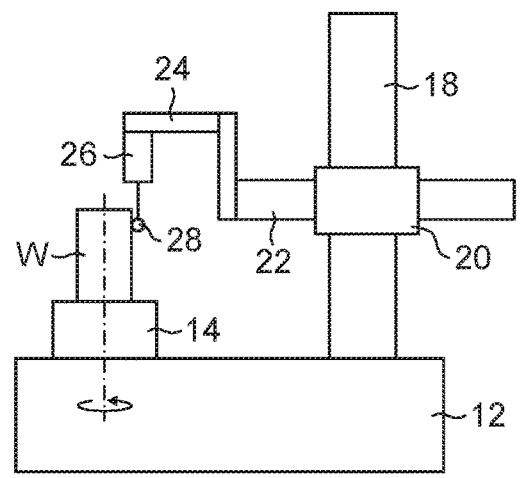
FIG. 4C is a diagram for explaining the processing shown in the flowchart of FIG. 3.

Specifically, as shown in FIG. 4C, the workpiece W is placed on the rotary table 14 in place of the master workpiece MW, and after performing eccentricity correction and inclination correction such that the workpiece center more precisely coincides with the rotational center of the rotary table 14, the arm 22 is moved in the X-direction such that the probe 28 comes into contact with the surface of the workpiece W on the one side (0-degree position) in the X-direction. Then, the calculation processing unit 34 functions as the first shape data acquiring unit 38, and acquires detector position data $R_1$ indicating the X-directional position of the detector 26 when the output of the detector 26 indicates a value "+α" displaced from the origin point (origin) toward the positive side (rightward in FIGS. 4A to 4E) from the detector position detecting unit 60. Furthermore, as shown in FIG. 4C, in this state, while rotationally driving the rotary table 14 by the motor 16 to rotate the workpiece W, the calculation processing unit 34 acquires from the detector 26, displacement data $T_1$ indicating a displacement of the probe 28 which is in contact with the surface of the workpiece W. In addition, the calculation processing unit 34 acquires from the rotational angle detecting unit 62, rotational angle data $\theta_1$ indicating a rotational angle of the workpiece W when detecting the displacement of the probe 28. In this stage, measurement is performed at many measurement points (for example, 14400 points) during one rotation of the workpiece W, and for each measurement point, the output (displacement data) $T_1$ of the detector 26 is stored in association with the output (rotational angle data) $\theta_1$ of the rotational angle detecting unit 62. Note that these data $R_1$, $T_1$ and $\theta_1$ are collectively referred to as first shape data A.

(Step S12: Second Shape Data Acquiring Step)

Figure 4D:
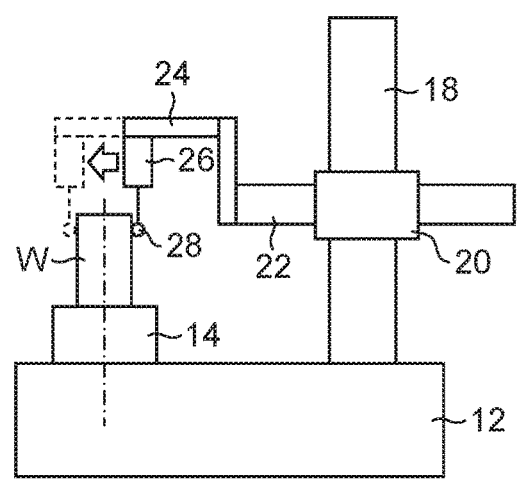
FIG. 4D is a diagram for explaining the processing shown in the flowchart of FIG. 3.
Figure 4E:
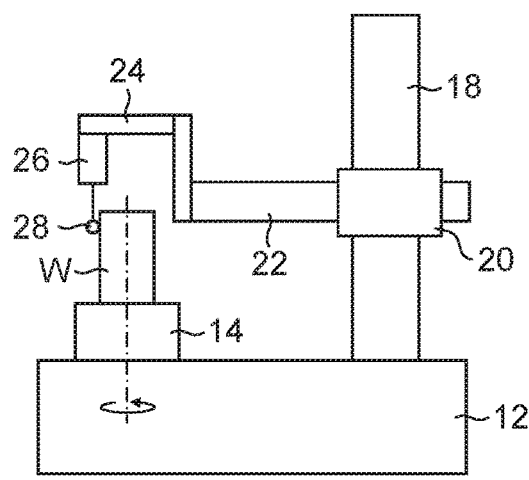
FIG. 4E is a diagram for explaining the processing shown in the flowchart of FIG. 3.

Next, as shown in FIG. 4D, the detector 26 is moved to the opposite side relative to the workpiece W, and the arm 22 is moved in the X-direction such that the probe 28 comes into contact with the surface of the workpiece W on the other side (180-degree position) in the X-direction. Then, the calculation processing unit 34 functions as the second shape data acquiring unit 40, and acquires detector position data $R_2$ indicating the X-directional position of the detector 26 when the output of the detector 26 indicates a value "−α" displaced from the origin point toward the negative side (leftward in FIGS. 4A to 4E) from the detector position detecting unit 60. Furthermore, as shown in FIG. 4E, in this state, while rotationally driving the rotary table 14 by the motor 16 to rotate the workpiece W, the calculation processing unit 34 acquires from the detector 26, displacement data $T_2$ indicating a displacement of the probe 28 which is in contact with the surface of the workpiece W. In addition, the calculation processing unit 34 acquires from the rotational angle detecting unit 62, rotational angle data $\theta_2$ indicating a rotational angle of the workpiece W when detecting the displacement of the probe 28. In this stage, measurement is performed at many measurement points (for example, 14400 points) during one rotation of the workpiece W, and for each measurement point, the output (displacement data) $T_2$ of the detector 26 is stored in association with the output (rotational angle data) $\theta_2$ of the rotational angle detecting unit 62. Note that these data $R_2$, $T_2$ and $\theta_2$ are collectively referred to as second shape data B.

Here, since the first shape data acquiring step (step S10) and the second shape data acquiring step (step S12) are performed with the detector 26 disposed at the positions opposite to each other relative to the workpiece W (specifically, relative to the rotational axis center of the rotary table 14), the first shape data A and the second shape data B are in the relation where their phases are shifted by 180 degrees in the circumferential direction around the rotational center. Namely, the difference between the positions of the detector 26 causes the phase shift (inversion of the phase) between the first shape data A and the second shape data B. Therefore, before performing the next shape parameter calculating step (step S14), processing (phase inverting processing) of shifting the phase of any one of the first shape data A and the second shape data B by 180 degrees relative to the phase of the other is performed in order to correct the phase shift caused by the difference between the measurement positions (that is, the detection positions of the detector 26 with respect to the workpiece W). Thereby, the phases of the first shape data A and the second shape data B coincide with each other, both of the displacement data (output of the detector 26) $T_1$ corresponding to the rotational angle data $\theta_1$ and the displacement data (output of the detector 26) $T_2$ corresponding to the rotational angle data $\theta_2$ indicate displacement data at the same position on the surface of the workpiece W.

(Step S14: Shape Parameter Calculating Step)

Next, the calculation processing unit 34 functions as the shape parameter calculating unit 42, collates the two shape data (the first shape data A and the second shape data B) acquired in step S10 and step S12 with each other, and based on the result of the collation, calculates the diameter of the workpiece W which is a shape parameter defining the surface shape of the workpiece W. Specifically, it is performed as follows.

First, the radial directional position calculating unit 46 calculates, based on the first shape data A, "$S_1=R_1+T_1$" which is a radial directional position of the surface of the workpiece W (distance from the workpiece center to the workpiece surface) as a first radial directional position for each rotational angle $\theta_1$ of the workpiece W detected by the rotational angle detecting unit 62.

Moreover, the radial directional position calculating unit 46 calculates, based on the second shape data B, "$S_2=R_2+T_2$" which is a radial directional position of the surface of the workpiece W (distance from the workpiece center to the workpiece surface) as a second radial directional position for each rotational angle $\theta_2$ of the workpiece W detected by the rotational angle detecting unit 62.

Next, the radial directional position correcting unit 48 calculates "$S=(S_1+S_2)/2$" which is a corrected radial directional position of the surface of the workpiece W for each rotational angle $\theta(=\theta_1$ and $\theta_2)$ of the workpiece W based on the two radial directional positions (the first radial directional position $S_1$ and the second radial directional position $S_2$) of the surface of the workpiece W calculated by the radial directional position calculating unit 46. Namely, the middle position obtained by simply averaging the two radial directional positions $S_1$ and $S_2$ is calculated as the corrected radial directional position S. For example, supposing that the first radial directional position is 25 mm when $\theta_1=45$ degrees and the second radial directional position is 30 mm when $\theta_2=45$ degrees, the corrected radial directional position of the surface of the workpiece W corresponding to $\theta=45$ degrees is 27.5 mm.

Figure 5A:
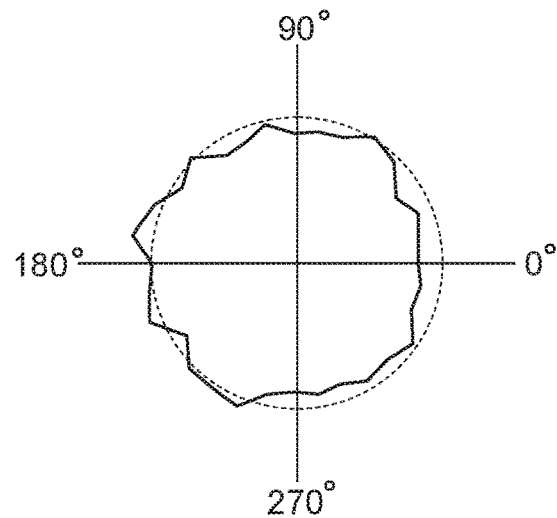
FIG. 5A is a diagram exemplarily showing surface shape data (recorded diagram) of the workpiece obtained using only first measurement data.
Figure 5B:
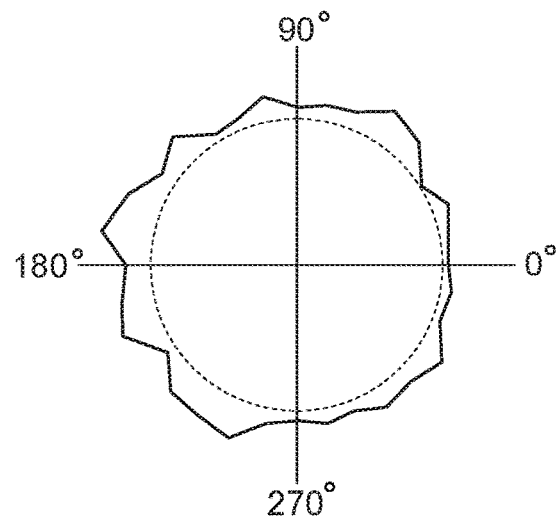
FIG. 5B is a diagram exemplarily showing surface shape data (recorded diagram) of the workpiece W obtained using only second measurement data.

Herein, a case where an elongation or a distortion of the column 18 or the main body base 12 occurs due to change in environmental temperature or the like during a period from the measurement of the master workpiece MW to the measurement of the workpiece W, and the detector position detecting unit 60 (X-axis linear encoder) deviates by an error v relative to the rotational center of the rotary table 14 (workpiece center) in the X-direction is considered. In this case, the radial directional positions of the surface of the workpiece W calculated for each rotational angle become "$S_1-v$" and "$S_2+v$". Therefore, while the surface shape of the workpiece W (recorded diagram) obtained by using only the first shape data A becomes smaller than the reference circle, for example, as shown in FIG. 5A, the surface shape of the workpiece W obtained by using only the second shape data B becomes larger than the reference circle as shown in FIG. 5B. Thus, a measurement error "$\delta=2v$" occurs in the diameter of the workpiece W calculated based on only one of the first shape data A and the second shape data B. Accordingly, it is difficult to calculate the diameter of the workpiece W with excellent precision.

Figure 6:
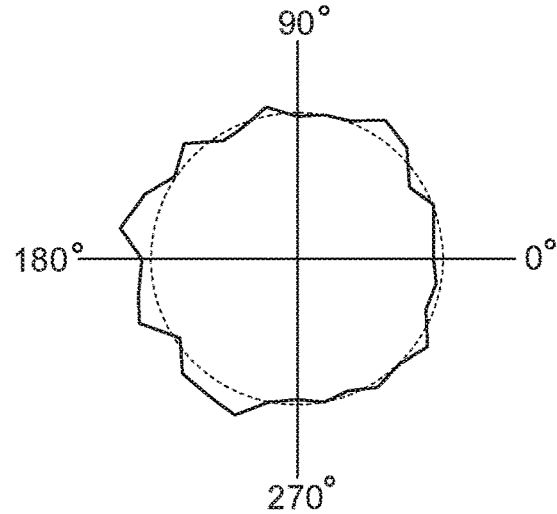
FIG. 6 is a diagram exemplarily showing surface shape data (recorded diagram) of a workpiece W obtained using the first measurement data and the second measurement data.

On the other hand, in the embodiment, the middle position obtained by simply averaging the radial directional positions $S_1$ and $S_2$ of the surface of the workpiece W calculated for each rotational angle is obtained as the corrected radial directional position S. Therefore, even when an elongation or a distortion of the column 18 or the main body base 12 occurs due to change in environmental temperature or the like during a period from the measurement of the master workpiece MW to the measurement of the workpiece W, and the detector position detecting unit 60 (X-axis linear encoder) deviates by an error v relative to the rotational center of the rotary table 14 (workpiece center) in the X-direction, the corrected radial directional position in this case can be obtained as "$S=\{(S_1-v)+(S_2+v)\}/2$". Hence, the error v can be cancelled. Accordingly, as shown in FIG. 6, the surface shape data (recorded diagram) of the workpiece W can be a shape having a size close to the true size (size of the reference circle) without influence of the error v. Accordingly, as compared with the case where the diameter of the workpiece W is calculated based on only one measurement data of the first shape data A and the second shape data B, the diameter of the workpiece W can be calculated with high precision.

Here, in the embodiment, a mode where the middle position obtained by simply averaging the radial directional positions $S_1$ and $S_2$ of the workpiece W is set to be the corrected radial directional position S is presented as a preferred mode. However, modes are not limited to this mode. For example, a mode where the position "$S=\{a\times S_1+b\times S_2\}/2$" (where $a+b=1$, $a>0$ and $b>0$) obtained by weighted averaging the radial directional positions $S_1$ and $S_2$ is set to be the corrected radial directional position may be employed. Also in this mode, influence of the error v can be suppressed, and as compared with the case where the diameter of the workpiece W is calculated based on only one of the first shape data A and the second shape data B, the diameter of the workpiece W can be calculated with excellent precision.

Next, the diameter calculating unit 50 obtains a diameter $D_0$ of the workpiece W by a center method (a least squares center method, a maximum inscribed circle method, a minimum circumscribed circle method or the like) based on the corrected radial directional position S of the workpiece W calculated by the radial directional position correcting unit 48. Then, by subtracting the correction value e calculated by the correction value calculating unit 44 from the diameter $D_0$ obtained as above, the true diameter "$D=D_0-e$" is obtained.

(Step S16: Outputting Step)

Next, the calculation processing unit 34 outputs, as the calculation processing result, the shape parameter (diameter D of the workpiece W) calculated in step S14 to the displaying unit 36. Thereby, the diameter D of the workpiece W is displayed on the displaying unit 36, and this flowchart is ended.

Next, effects of the first embodiment are described.

The surface shape measuring method using the roundness measuring device 10 according to the first embodiment includes: the first shape data acquiring step of acquiring the first shape data A indicating the surface shape of the workpiece W when detecting a displacement of the surface of the workpiece W by the detector 26 disposed on one side with respect to the workpiece W while rotating the workpiece W relatively to the detector 26 around the rotational center; the second shape data acquiring step of acquiring the second shape data B indicating the surface shape of the workpiece W when detecting a displacement of the surface of the workpiece W by the detector 26 disposed on the other side with respect to the workpiece W while rotating the workpiece W relatively to the detector 26 around the rotational center; and the shape parameter calculating step of collating the first shape data A and the second shape data B with each other, and calculating the diameter of the workpiece W, which is a shape parameter defining the surface shape of the workpiece W, based on the result of the collation. Thereby, since even when the roundness of the workpiece W is low, the shape parameter (diameter of the workpiece W) defining the surface shape of the workpiece W is calculated based on the two shape data A and B obtained by rotating the workpiece W, a measurement error does not occur, and moreover, a variation in the measurement result does not occur depending on the measurement position of the detector 26 with respect to the workpiece W (position at which the probe 28 is brought into contact with the workpiece W). Moreover, according to the surface shape measuring method, for example, a long side and a short side of an ellipsoid can also be calculated with excellent precision. Accordingly, the surface shape of the workpiece W can be measured with high precision and high reproducibility, and the measuring method has excellent versatility.

Moreover, in the first embodiment, by collating the first shape data A and the second shape data B with each other, measurement precision of the surface shape of the workpiece W can be evaluated based on the result of the collation (as an example of an evaluating step). That is, when the first shape data A and the second shape data B are overlapped with each other, the difference ($=|S_1-S_2|$) between the radial directional positions $S_1$ and $S_2$ of the surface of the workpiece W for each rotational angle $\theta$ ($=\theta_1$ and $\theta_2$) of the workpiece W is compared with a preset reference value. Then, when the difference is not more than the reference value, it can be determined that required measurement precision is satisfied. When the difference exceeds the reference value, it can be determined that the required measurement precision is not satisfied. Thereby, a user can simply judge measurement precision of the surface shape of the workpiece W in the roundness measuring device 10. In this case, the calculation processing unit 34 functions as an evaluating unit.

Here, in the first embodiment, after correcting the radial directional position of the surface of the workpiece W for each rotational angle $\theta(=\theta_1$ and $\theta_2)$ of the workpiece W based on the two shape data A and B in the shape parameter calculating step of step S16, the diameter of the workpiece W is calculated. However, modes should not be limited to this mode. For example, the following calculating method can also be employed.

Namely, similarly to the aforementioned embodiment, the radial directional position calculating unit 46 calculates "$S_1=R_1+T_1$" which is the first radial directional position of the surface of the workpiece W based on the first shape data A acquired in step S12, and calculates "$S_2=R_2+T_2$" which is the second radial directional position of the surface of the workpiece W based on the second shape data B acquired in step S14. The first radial directional position $S_1$ and the second radial directional position $S_2$ calculated by the radial directional position calculating unit 46 are input to the diameter calculating unit 50 (see FIG. 2).

Next, the diameter calculating unit 50 calculates a diameter $D_1$ of the workpiece W (first diameter) based on the first radial directional position $S_1$ of the surface of the workpiece W calculated by the radial directional position calculating unit 46 by a center method (a least squares center method, a maximum inscribed circle method, a minimum circumscribed circle method or the like).

Moreover, the diameter calculating unit 50 calculates a diameter $D_2$ of the workpiece W (second diameter) which can be obtained by a center method (a least squares center method, a maximum inscribed circle method, a minimum circumscribed circle method or the like) based on the second radial directional position $S_2$ of the surface of the workpiece W calculated by the radial directional position calculating unit 46.

Furthermore, the diameter calculating unit 50 calculates "$D_0=(D_1+D_2)/2$" which is the diameter of the workpiece W based on the first diameter $D_1$ and the second diameter $D_2$ of the workpiece W obtained as above. That is, the diameter $D_0$ of the workpiece W is calculated by simply averaging the first diameter $D_1$ and the second diameter $D_2$ of the workpiece W. Then, by subtracting the correction value e calculated by the correction value calculating unit 44 from the diameter $D_0$ obtained as above, the true diameter "$D=D_0-e$" is obtained.

Moreover, in the first embodiment, as a preferred mode, a mode of obtaining the diameter $D_0$ of the workpiece W by simply averaging the first diameter $D_1$ and the second diameter $D_2$ is presented. However, modes should not be limited to this mode. A mode where the diameter "$D_0=\{p\times D_1 q\times D_2\}/2$" (where $p+q=1$, $p>0$ and $q>0$) is obtained by weighted averaging of the first diameter $D_1$ and the second diameter $D_2$ of the workpiece W can also be employed.

Here, in the first embodiment, the case where the shape parameter (diameter of the workpiece W) defining the surface shape of the workpiece W is measured using the roundness measuring device 10 is described. However, modes should not be limited to this. For example, measurement may be performed using a roundness measuring device 100 according to a second embodiment mentioned later, or measurement may be performed using another roundness measuring device.

Second Embodiment

Next, the second embodiment is described. Note that description is made again throughout its entirety although there are portions overlapping with those in the aforementioned first embodiment.

Figure 7:
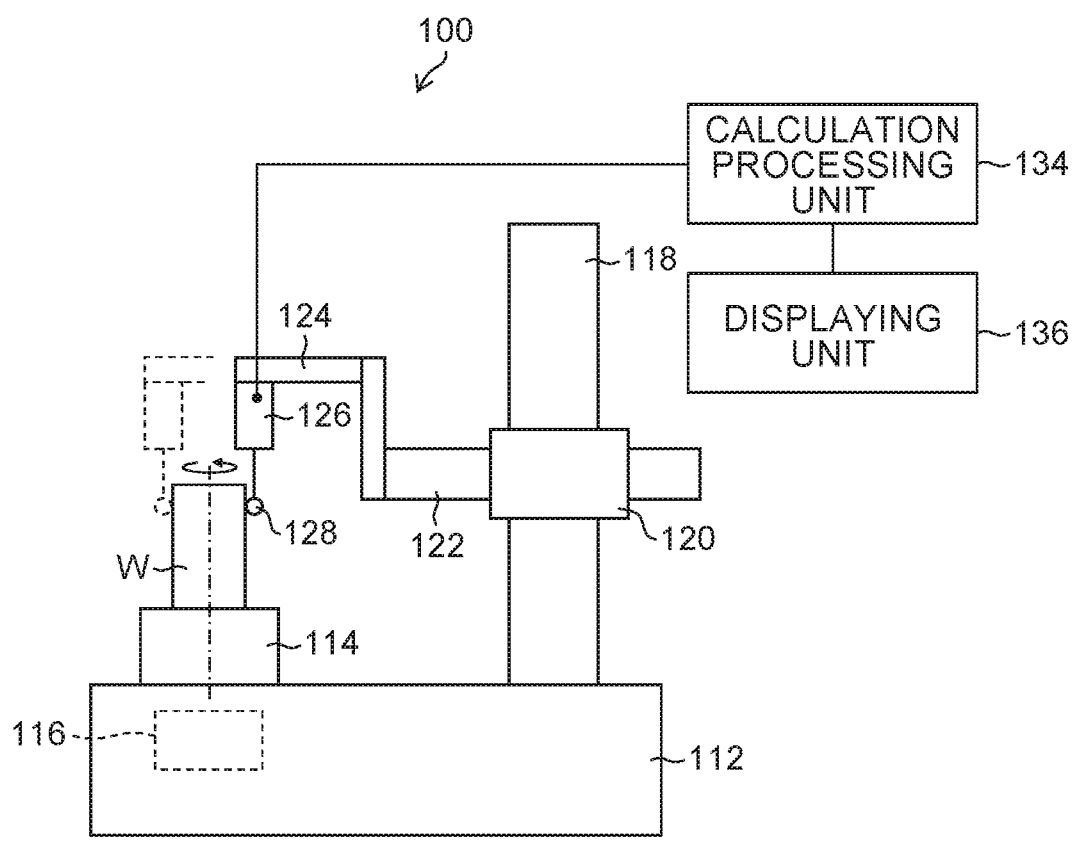
FIG. 7 is a schematic diagram showing a configuration of a roundness measuring device according to a second embodiment.

FIG. 7 is a schematic diagram showing a configuration of the roundness measuring device 100 according to the second embodiment.

As shown in FIG. 7, the roundness measuring device 100 according to the second embodiment includes a rotary table (rotary table) 114 on which a workpiece (measuring object) W is placed on a main body base (base stage) 112. The rotary table 114 is configured to be finely fed (inched) in the X-direction and the Y-direction with an X-direction fine movement knob (not shown) and a Y-direction fine movement knob (not shown). The inclination of the rotary table 114 is adjusted in the X-direction and the Y-direction with an X-direction inclining knob (not shown) and a Y-direction inclining knob (not shown).

Note that the X-direction, the Y-direction and the Z-direction are directions perpendicular to one another, the X-direction is a horizontal direction (corresponding to the movement direction of an arm 122 mentioned later), the Y-direction is the horizontal direction perpendicular to the X-direction, and the Z-direction is the vertical direction (corresponding to the movement direction of a carriage 120 mentioned later).

The rotary table 114 is rotatably supported by a motor (rotary driving unit) 116 via a bearing (not shown). To a rotary shaft of the motor 116, a rotary encoder (not shown) is attached, and the rotary encoder is configured to read a rotational angle with high precision. For the bearing, for example, a hydrostatic air bearing with super high precision is used, and the rotary table 114 is rotated with very high rotational precision (for example, 0.005 μm). The rotary encoder is an example of means (rotational angle detecting means) that detects a rotational angle of the workpiece W, and detects the rotational angle of the workpiece W placed on the rotary table 114 by detecting a rotational angle of the motor 116. A detection signal (rotational angle data) output from the rotary encoder is input to a calculation processing unit 134 mentioned later. Note that the rotational angle detecting means is not limited to the rotary encoder. For example, the rotational angle of the workpiece W may be detected based on information of a drive signal (pulse number) of the motor 116 driving the rotary table 114.

On the main body base 112, a column (support strut) 118 extending in the vertical direction (Z-direction) is stood, and on the column 118, the carriage 120 is supported freely movably in the vertical direction (Z-direction). On the carriage 120, the arm (radial directional movement axis) 122 is supported freely movably in one horizontal axis direction (X-direction). A detector holder 124 is attached to the tip of the arm 122. A detector 126 is attached to the tip of the detector holder 124. For the detector 126, an electric micrometer using a differential transformer is used, and the detector 126 detects a displacement amount of a probe 128 which is in contact with the surface of the workpiece W.

The detector 126 includes a bidirectional detector having a bidirectional (both of rightward and leftward directions in FIG. 7) detection function in the radial direction (X-direction) perpendicular to the rotational axis center of the rotary table 114. Since the configuration of a bidirectional detector is known, its detailed description is omitted here. Here, the detector 126 is not limited to one having a bidirectional detection function. The detector may be one having a detection function for only one direction. In this case, it is sufficient that the orientation of the detector 126 is changed in accordance with the direction (orientation) in which the probe 128 is brought into contact with the lateral surface of the workpiece W.

The positions of the detector 126 (the X-directional position and the Z-directional position) can be detected by an X-axis linear encoder (not shown) that detects the position of the arm 122 which moves the detector 126 in the X-direction, and a Z-axis linear encoder (not shown) that detects the position of the carriage 120 which moves the detector 126 in the Z-direction. Detection signals (detector position data) respectively output from the X-axis linear encoder and the Z-axis linear encoder are input to the calculation processing unit 134 mentioned later. Thus, the calculation processing unit 134 can grasp the position of the detector 126 (the X-directional position and the Z-directional position) from the detector position data detected by the X-axis linear encoder and the Z-axis linear encoder when calculating shape parameters such as the diameter, the degree of cylindricity, and the degree of coaxiality of the workpiece W.

Here, detecting means of detecting the position of the detector 126 is not limited to the linear encoders. The position of the detector may be detected by a rotary encoder via a mechanism that converts the linear movement of the detector 126 (arm 122) into rotary motion. Moreover, the detection system of the encoder is not specially limited and various systems such as an optical system, a magnetic system, a laser system, a mechanical system and a capacitance system can be employed. Moreover, detecting means is not limited to an encoder. As long as it can detect the position of the detector 126, detecting means with any other configuration can be employed.

When measuring the roundness or the like of the workpiece W by the roundness measuring device 100 according to the second embodiment, after the workpiece W is placed on the rotary table 114, first, eccentricity correction between the rotational center of the rotary table 114 and the center of the workpiece W, and inclination correction of the workpiece W relative to the rotary table 114 are performed.

Next, the rotary table 114 is rotated by one rotation with the motor 116 in the state where the probe 128 of the detector 126 is in contact with the surface (lateral surface) of the workpiece W, and data of the surface of the workpiece W for the one rotation is obtained. The detection signal (displacement data) output from the detector 126 is input to the calculation processing unit 134. The roundness or the like of the workpiece W is obtained by calculation processing from the rotational angle data input from the rotary encoder and the displacement data input from the detector 126 in the calculation processing unit 134, and the calculation processing result is displayed on a displaying unit 136.

Here, as mentioned later in detail, in the roundness measuring device 100 according to the second embodiment, the calculation processing unit 134 has a function of performing various kinds of calculation processing for obtaining a misalignment amount of the roundness measuring device 100 with excellent precision without using a reference workpiece (reference measuring object) having a known diameter.

Figure 8:
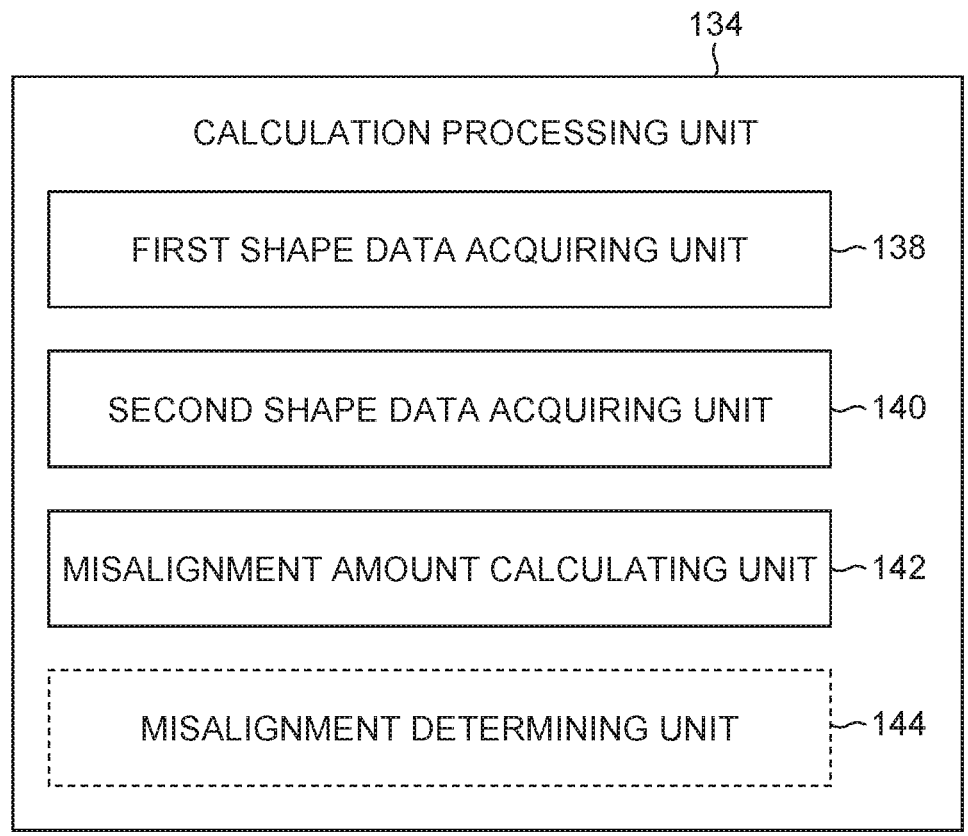
FIG. 8 is a functional block diagram showing a functional configuration of a calculation processing unit.

FIG. 8 is a functional block diagram showing a functional configuration of the calculation processing unit 134. As shown in FIG. 8, in order to perform the aforementioned various kinds of calculation processing, the calculation processing unit 134 operates as the following functional units. Namely, the calculation processing unit 134 functions as a first shape data acquiring unit 138, a second shape data acquiring unit 140, a misalignment amount calculating unit 142 and the like.

The first shape data acquiring unit 138 acquires the first shape data indicating the surface shape (measurement sectional shape) of the workpiece W when measurement is performed in the state where the probe 128 is brought into contact with the surface of the workpiece W from one side with respect to the workpiece W.

The second shape data acquiring unit 140 acquires the second shape data indicating the surface shape (measurement sectional shape) of the workpiece W when measurement is performed in the state where the probe 128 is brought into contact with the surface of the workpiece W from the other side with respect to the workpiece W.

The misalignment amount calculating unit 142 collates the first shape data and the second shape data with each other, and calculates the misalignment amount of the roundness measuring device 100 based on the result of the collation.

Note that the calculation processing unit 134 sometimes functions as a misalignment determining unit 144 that determines the presence or absence of misalignment of the roundness measuring device 100 based on the calculation result of the misalignment amount calculated by the misalignment amount calculating unit 142.

Next, a misalignment amount calculating method using the roundness measuring device 100 according to the second embodiment is described.

Figure 9:
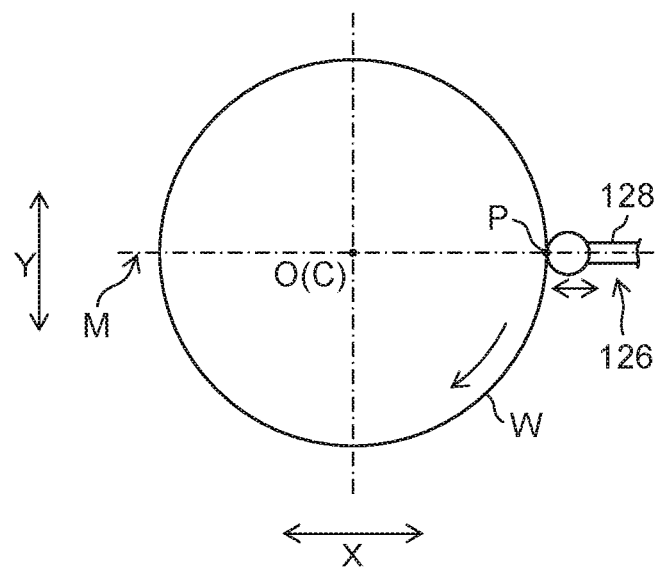
FIG. 9 is a schematic diagram showing a status when measurement is performed in a state where misalignment does not exist in a roundness measuring device.
Figure 10:
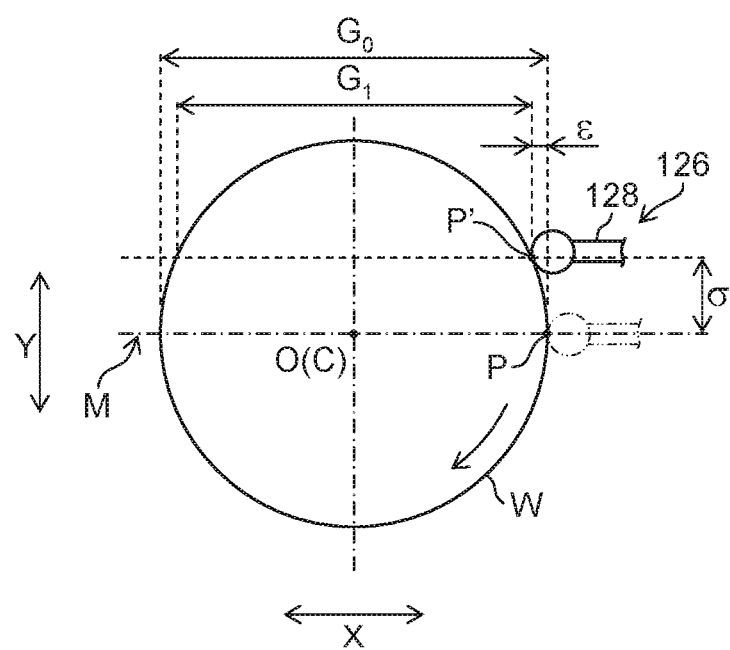
FIG. 10 is a schematic diagram showing a status when measurement is performed in a state where misalignment exists in the roundness measuring device.

FIG. 9 is a schematic diagram showing a status when measurement is performed in the state where misalignment does not exist in the roundness measuring device 100. FIG. 10 is a schematic diagram showing a status when measurement is performed in the state where misalignment exists in the roundness measuring device 100. Note that it is supposed that a center C of the workpiece W here coincides with a rotational center O of the rotary table 114. Moreover, it is supposed that the center C of the workpiece W is set to be the center of the least squares circle of the surface shape (measurement sectional shape) of the workpiece W obtained when rotating the workpiece W relatively to the detector 126.

As shown in FIG. 9, the probe 128 of the detector 126 can be displaced in the X-direction parallel to a measurement generating line M in response to roughness (concave and convex) of the surface of the workpiece W when measurement is performed by rotating the workpiece W in the state where the probe 128 of the detector 126 is in contact with the surface of the workpiece W. This displacement of the probe 128 is detected by the detector 126. Then, the calculation processing unit 134 acquires shape data which indicates the surface shape of the workpiece W. The shape data includes the rotational angle data output from the rotary encoder and the displacement data output from the detector 126. The calculation processing unit 134 performs various kinds of calculation processing based on this shape data, and calculates a shape parameter (diameter or the like) defining the surface shape of the workpiece W to analyze the shape of the workpiece W.

Here, when a detection point P at which the probe 128 comes into contact with the surface of the workpiece W coincides with the measurement generating line M as shown in FIG. 9, the shape data indicating the surface shape of the workpiece W can be acquired with excellent precision, and as a result, the shape parameter of the workpiece W can be obtained with excellent precision.

However, as shown in FIG. 10, due to various factors such as errors intrinsic to the device caused in production of the roundness measuring device 100, environmental change such as change in temperature, and chronological change, there may be a case where the detection point P at which the probe 128 comes into contact with the surface of the workpiece W does not coincide with the measurement generating line M such that a positional deviation occurs in the direction perpendicular to the measurement generating line M, and the probe 128 comes into contact with the surface of the workpiece W at a detection point P' different from the ideal detection point P. In this case, a distance $\sigma$ between the ideal detection point P and the actual detection point P' in the Y-direction perpendicular to the X-direction (displacement direction of the probe 28) represents the misalignment amount which is a deviation amount between the measurement generating line M and the detection point P' (hereinafter the distance $\sigma$ is referred to as misalignment amount $\sigma$). Further, when such a misalignment amount $\sigma$ exists, a positional deviation in the displacement direction of the probe 128 (X-direction) occurs between the ideal detection point P and the actual detection point P' and a measurement error occurs by this difference (distance) $\varepsilon$ (hereinafter, the difference $\varepsilon$ is referred to as measurement error $\varepsilon$).

Namely, when there is no misalignment in the roundness measuring device 100, measurement is performed at the ideal detection point P, and hence, the diameter which is an example of the shape parameter of the workpiece W is obtained as $G_0$. In contrast, when there is misalignment in the roundness measuring device 100, measurement is performed at the detection point P' different from the ideal detection point P, and hence, the diameter of the workpiece W is obtained as $G_1$ smaller than $G_0$. In this case, relation of the expression "$G_1=G_0-2\varepsilon$" is established.

Accordingly, when measurement is performed in the state where there is misalignment in the roundness measuring device 100, this causes deterioration in measurement precision of the surface shape of the workpiece W obtained by the roundness measuring device 100. In other words, the misalignment amount $\sigma$ of the roundness measuring device 100 affects measurement precision of the surface shape of the workpiece W.

Here, although errors intrinsic to the device in its production can be reduced down to allowable levels by applying various kinds of adjusting means in shipping or the like, it is difficult to completely remove the measurement error c caused by the misalignment amount $\sigma$ since a variation originated from chronological change and environmental change fluctuates over time.

In the misalignment amount calculating method according to the embodiment, as mentioned later in detail, the first shape data and the second shape data respectively indicating the surface shape of the workpiece W are acquired when measurements are performed at positions opposite to each other relative to the workpiece W, the first shape data and the second shape data are collated with each other, and then the misalignment amount $\sigma$ of the roundness measuring device 100 is calculated based on the result of the collation. Hereafter, the details are described.

Figure 11:
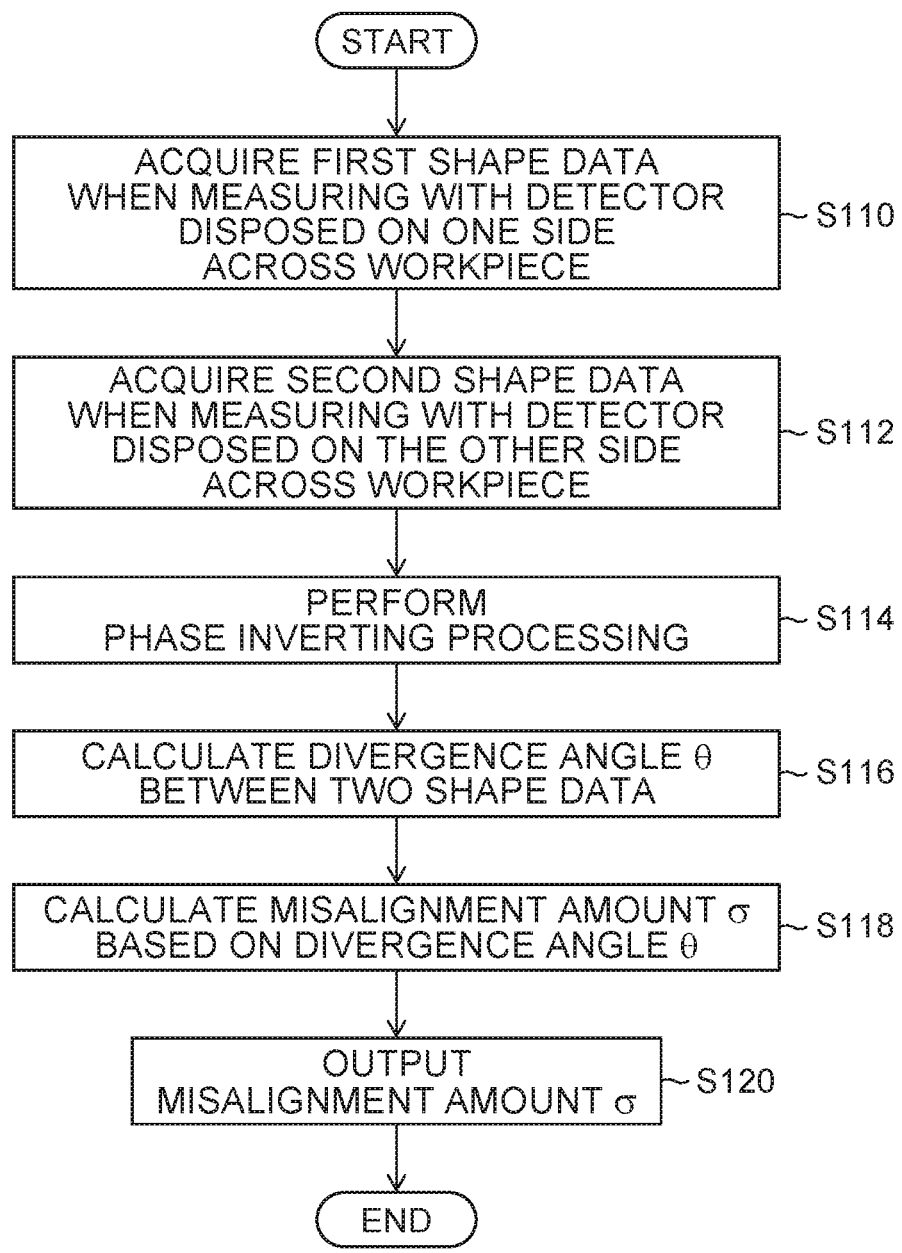
FIG. 11 is a flowchart exemplarily showing a misalignment amount calculating method using the roundness measuring device according to a second embodiment.

FIG. 11 is a flowchart showing an example of the misalignment amount calculating method using the roundness measuring device 100 according to the second embodiment. FIG. 12A, FIG. 12B, FIG. 13A and FIG. 13B are diagrams for explaining the misalignment amount calculating method shown in FIG. 11. Note that it is supposed that at the start of the flowchart shown in FIG. 11, the workpiece W is placed on the rotary table 114 such that the center C of the workpiece W substantially coincides with the rotational center O of the rotary table 114, and eccentricity correction (centering adjustment) and inclination correction (tilting adjustment) have been performed as needed. Moreover, it is supposed that processing for calibrating the detector position detecting unit (X-axis linear encoder) has also been performed beforehand.

(Step S110: First Shape Data Acquiring Step)

Figure 12A:
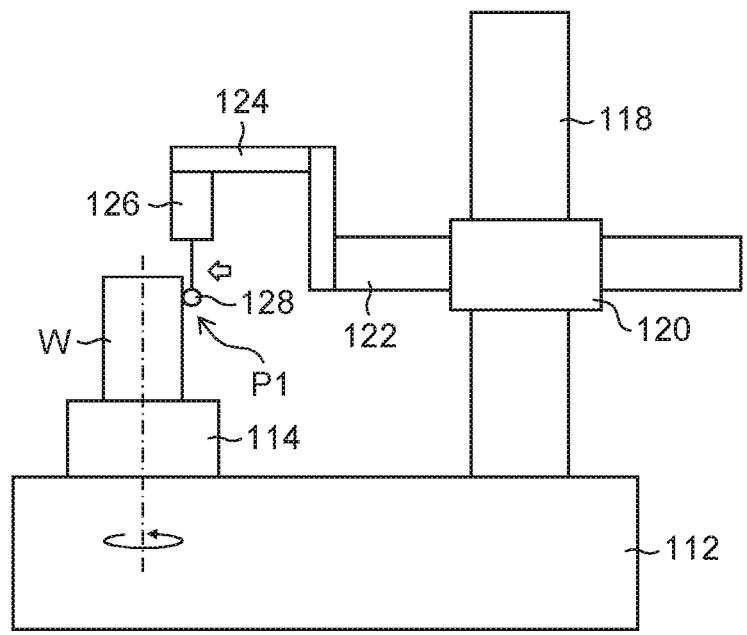
FIG. 12A is a diagram for explaining the misalignment amount calculating method using the roundness measuring device according to the second embodiment.
Figure 12B:
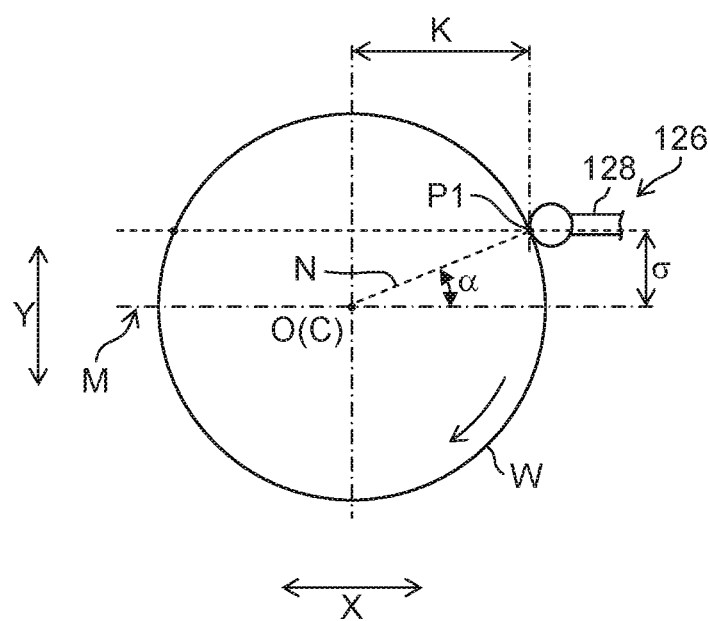
FIG. 12B is a diagram for explaining the misalignment amount calculating method using the roundness measuring device according to the second embodiment.

First, as shown in FIG. 12A and FIG. 12B, a displacement of the probe 128 is detected by the detector 126 while rotating the workpiece W relatively to the detector 126 by the rotary table 114 in the state where the probe 128 of the detector 126 is brought into contact with the surface of the workpiece W (right lateral surface) from one side (right side) with respect to the workpiece W. In this stage, the calculation processing unit 134 functions as the first shape data acquiring unit 138, and acquires the first shape data A of the surface of the workpiece W for one rotation.

(Step S112: Second Shape Data Acquiring Step)

Figure 13A:
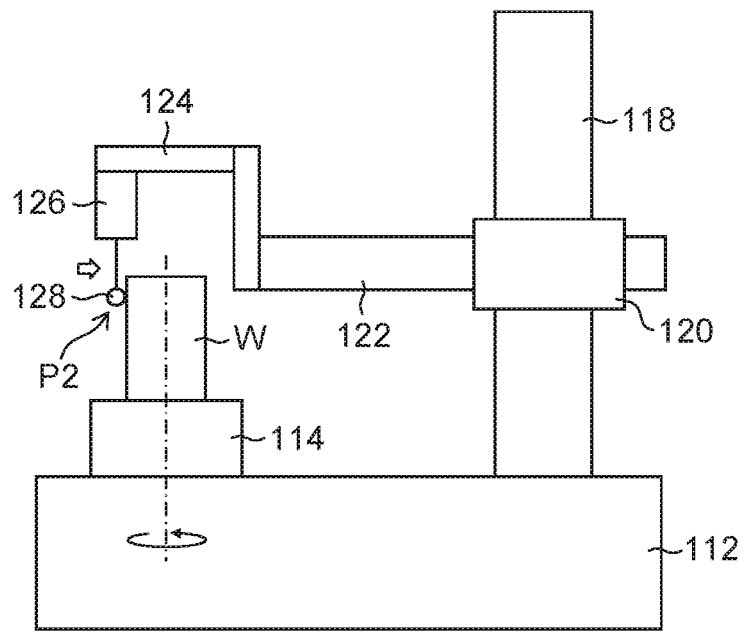
FIG. 13A is a diagram for explaining the misalignment amount calculating method using the roundness measuring device according to the second embodiment.
Figure 13B:
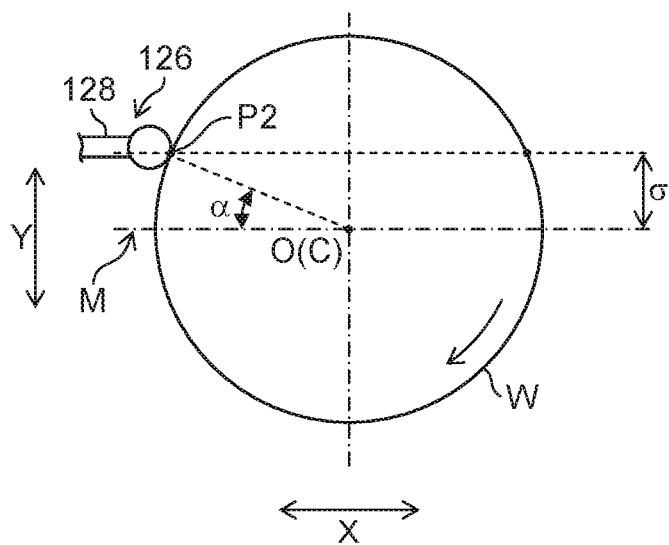
FIG. 13B is a diagram for explaining the misalignment amount calculating method using the roundness measuring device according to the second embodiment.

Next, as shown in FIG. 13A and FIG. 13B, the detector 126 is moved in the X-direction (direction parallel to the measurement generating line M) by moving the arm 122, and a displacement of the probe 128 is detected by the detector 126 while rotating the workpiece W relatively to the detector 126 by the rotary table 114 in the state where the probe 128 of the detector 126 is brought into contact with the surface of the workpiece W (left lateral surface) from the other side (left side) with respect to the workpiece W. In this stage, the calculation processing unit 134 functions as the second shape data acquiring unit 140, and acquires the second shape data B of the surface of the workpiece W for one rotation.

(Steps S114, S116 and S118: Misalignment Amount Calculating Step)

Next, the calculation processing unit 134 functions as the misalignment amount calculating unit 142, collates the first shape data A and the second shape data B with each other, and calculates the misalignment amount $\sigma$ of the roundness measuring device 100 based on the result of the collation.

Figure 14A:
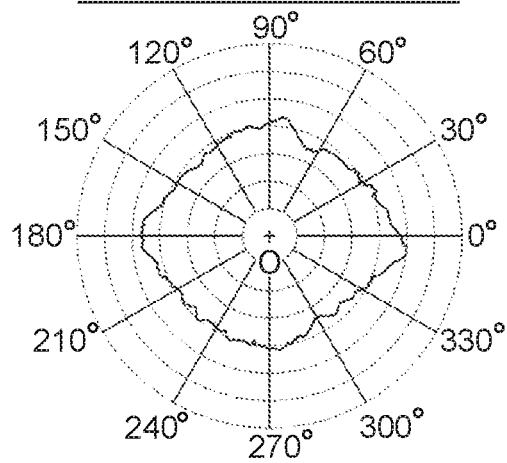
FIG. 14A is a diagram illustrating first shape data, for explanation of a calculation principle of a misalignment amount.
Figure 14B:
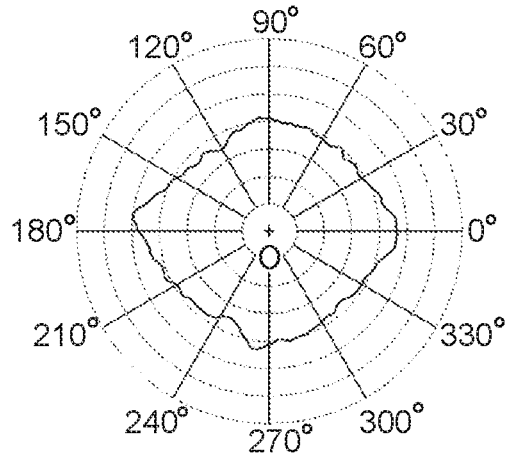
FIG. 14B is a diagram illustrating second shape data, for explanation of the calculation principle of the misalignment amount.
Figure 14C:
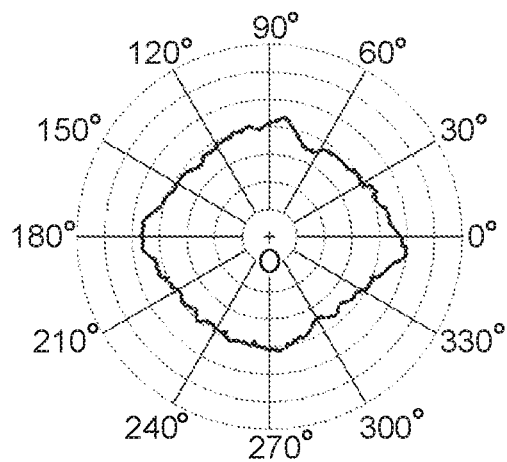
FIG. 14C is a diagram illustrating the two shape data after phase inverting processing, for explanation of the calculation principle of the misalignment amount.
Figure 15A:
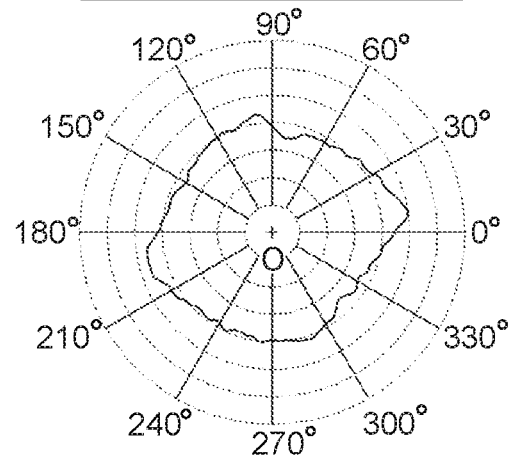
FIG. 15A is a diagram illustrating first shape data, for explanation of the calculation principle of the misalignment amount.
Figure 15B:
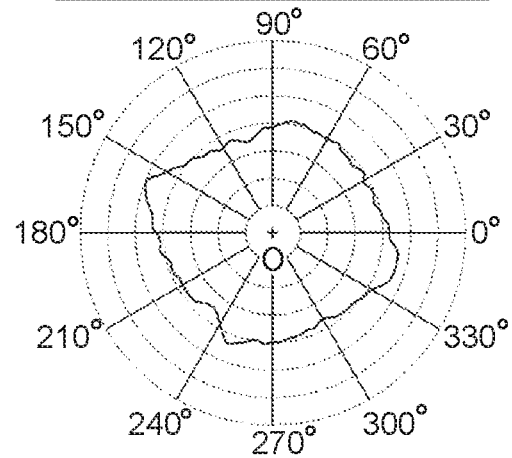
FIG. 15B is a diagram illustrating second shape data, for explanation of the calculation principle of the misalignment amount.
Figure 15C:
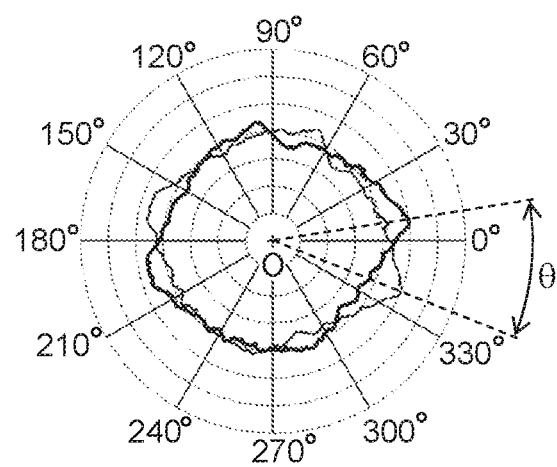
FIG. 15C is a diagram illustrating two shape data after phase inverting processing, for explanation of the calculation principle of the misalignment amount.

Herein, a calculation principle of the misalignment amount σ of the roundness measuring device 100 is described with reference to FIG. 14A to FIG. 14C and FIG. 15A to FIG. 15C. FIG. 14A to FIG. 14C and FIG. 15A to FIG. 15C are diagrams for explaining the calculation principle of the misalignment amount σ. FIG. 14A to FIG. 14C show measurement results in the case where misalignment does not exist, and FIG. 15A to FIG. 15C show measurement results in the case where misalignment exists.

First, when misalignment does not exist in the roundness measuring device 100, for example, the first shape data A shown in FIG. 14A and the second shape data B shown in FIG. 14B are obtained. In this case, the first shape data A and the second shape data B are in the relation that their phases are displaced (shifted) from each other by 180 degrees in the circumferential direction around the rotational center O. Namely, the first shape data A and the second shape data B are respectively obtained from measurements performed at detection points P1 and P2 which are opposite to each other across the workpiece W (see FIG. 12B and FIG. 13B), and the difference between the positions of the detection points P1 and P2 causes the above-mentioned phase shift. Accordingly, after processing (phase inverting processing) of shifting the phase of one of the first shape data A and the second shape data B by 180 degrees relative to the phase of the other in the circumferential direction around the rotational center O has been performed, if the first shape data A and the second shape data B are overlapped (superimposed) with each other, both of them coincide with each other as shown in FIG. 14C. Namely, when the two shape data A and B after the phase inverting processing coincide with each other, it can be determined that misalignment does not exist in the roundness measuring device 100.

On the other hand, when misalignment exists in the roundness measuring device 100, for example, the first shape data A shown in FIG. 15A and the second shape data B shown in FIG. 15B are obtained. In this case, after the aforementioned phase inverting processing has been performed in order to correct the phase shift caused by the difference between the positions of the detection points P1 and P2 at the time of acquiring the first shape data A and the second shape data B, if the first shape data A and the second shape data B are overlapped (superimposed) with each other, both of them do not coincide with each other as shown in FIG. 15C. Namely, when the two shape data A and B after the phase inverting processing do not coincide with each other, it can be determined that misalignment exists in the roundness measuring device 100. The reason is that when the aforementioned measurements (step S110 and step S112) are performed in the state where misalignment exists, the two detection points P1 and P2 do not exist at the positions opposite to each other across the rotational center O.

Herein, relation of "α=θ/2" is established, where θ indicates a divergence angle between the two shape data A and B after phase inverting processing in FIG. 15C, and N indicates a straight line connecting the rotational center O and the detection point P1 and α (hereinafter referred to as misalignment angle α) indicates an angle formed by the straight line N and the measurement generating line M in FIG. 12B.

Accordingly, by calculating the divergence angle θ between the two shape data A and B after phase inverting processing, the misalignment angle α (=θ/2) can be obtained based on this divergence angle θ. Moreover, the misalignment amount α of the roundness measuring device 100 can be obtained from the expression "α=K×tan α", where K indicates an X-directional distance from the rotational center O to the detection point P1 in FIG. 12B. Note that the X-directional distance K from the rotational center O to the detection point P1 is obtained from the aforementioned detector position data input from the X-axis linear encoder.

Moreover, as a calculating method of the divergence angle θ, for example, the method preferably includes: determining whether or not the two shape data A and B after the aforementioned phase inverting processing coincide with each other while rotating one of the two shape data by a constant angle relative to the other of the two shape data; and calculating the rotational angle when both shape data coincide with each other as the divergence angle θ. Note that the rotational angle not only in the case where both shape data coincide with each other but also in the case where both shape data can be regarded as being identical to each other (that is, the case where an error between both shape data is not more than a preset threshold) may be calculated as the divergence angle θ.

Moreover, as a determination method of whether or not both shape data coincide with each other, the determination method may include: obtaining differences between the two shape data A and B after phase inverting processing at respective sampling points; and calculating the rotational angle when the total value of the differences becomes minimum, as the divergence angle θ.

Or, similarly to the calculation method of the divergence angle θ, the determination method may include: determining whether or not the two shape data A and B before phase inverting processing coincide with each other while rotating one of the two shape data by a constant angle relative to the other of the two shape data; and calculating a value obtained by adding or subtracting 180 degrees to/from the rotational angle when the two shape data coincide with each other, as the divergence angle θ.

Returning to FIG. 11 to describe the flowchart again, after the first shape data A and the second shape data B are respectively acquired in step S110 and in step S112, the calculation processing unit 134 functions as the misalignment amount calculating unit 142, and performs the following processing.

That is, the calculation processing unit 134 performs phase inverting processing of shifting the phase of one of the first shape data A and the second shape data B by 180 degrees relative to the phase of the other in order to correct the phase shift due to the difference between the positions of the detection points P1 and P2 which are opposite to each other across the workpiece W (step S114).

Next, the calculation processing unit 134 calculates the divergence angle θ between the two shape data A and B after phase inverting processing (step S116), and furthermore, calculates the misalignment amount σ based on the divergence angle θ (step S118).

Here, as mentioned above, when misalignment does not exist in the roundness measuring device 100, the two shape data A and B after phase inverting processing coincide with each other as shown in FIG. 14C. Meanwhile, when misalignment exists in roundness measuring device 100, the two shape data A and B after phase inverting processing do not coincide with each other as shown in FIG. 15C, and ½ of the divergence angle θ between the shape data A and B in this stage corresponds to the aforementioned misalignment angle α (see FIG. 12B). Accordingly, the misalignment amount σ of the roundness measuring device 100 can be calculated based on the expression "σ=K×tan (θ/2)". Note that in this expression, K is an X-directional distance from the rotational center O to the detection point P1.

Next, the calculation processing unit 134 outputs the calculation result of the misalignment amount σ calculated in step S118 as the calculation processing result to the displaying unit 136 (step S120). Thereby, the misalignment amount σ of the roundness measuring device 100 is displayed on the displaying unit 136, and this flowchart is ended.

Next, effects of the second embodiment are described.

According to the misalignment amount calculating method using the roundness measuring device 100 according to the second embodiment, the first shape data A and the second shape data B indicating the surface shape of the workpiece W when the respective measurements are performed at positions opposite to each other across the workpiece W are acquired, the first shape data A and the second shape data B are collated with each other, and the misalignment amount σ of the roundness measuring device 100 is calculated based on the result of the collation. Thereby, without using a reference workpiece having a known diameter, the misalignment amount σ of the roundness measuring device 100 can be obtained with excellent precision in simple measurement operation.

Moreover, since in the second embodiment, the misalignment amount σ a of the roundness measuring device 100 can be obtained with excellent precision as mentioned above, a shape parameter (roundness, the degree of cylindricity, a diameter or the like) defining the surface shape of the workpiece W can be calculated using the result, with excellent precision. For example, when obtaining the diameter D of the workpiece W (=$G_0$) which is an example of the shape parameter, the diameter D of the workpiece W can be calculated based on the expression "D=2 sqrt ($K^2+\sigma^2$)". Here, the sign "sqrt (*)" represents the square root of *.

Herein, the above expression indicates that the diameter D of the workpiece W has an error which changes depending on the measurement of the misalignment amount σ. Namely, if the diameter D of the workpiece W is calculated without the misalignment amount σ taken into consideration, the diameter includes an error by an amount depending on the misalignment amount σ. In contrast, in the embodiment, since the diameter D of the workpiece W can be obtained with the misalignment amount σ taken into consideration, the diameter D of the workpiece W can be correctly obtained.

Moreover, in the second embodiment, the misalignment amount σ calculated based on the two shape data A and B is output to the displaying unit 136. Instead of this, the presence or absence of misalignment in the roundness measuring device 100 may be determined based on the magnitude of the calculated misalignment amount σ such that a user can easily judge measurement precision of the roundness measuring device 100.

Figure 16:
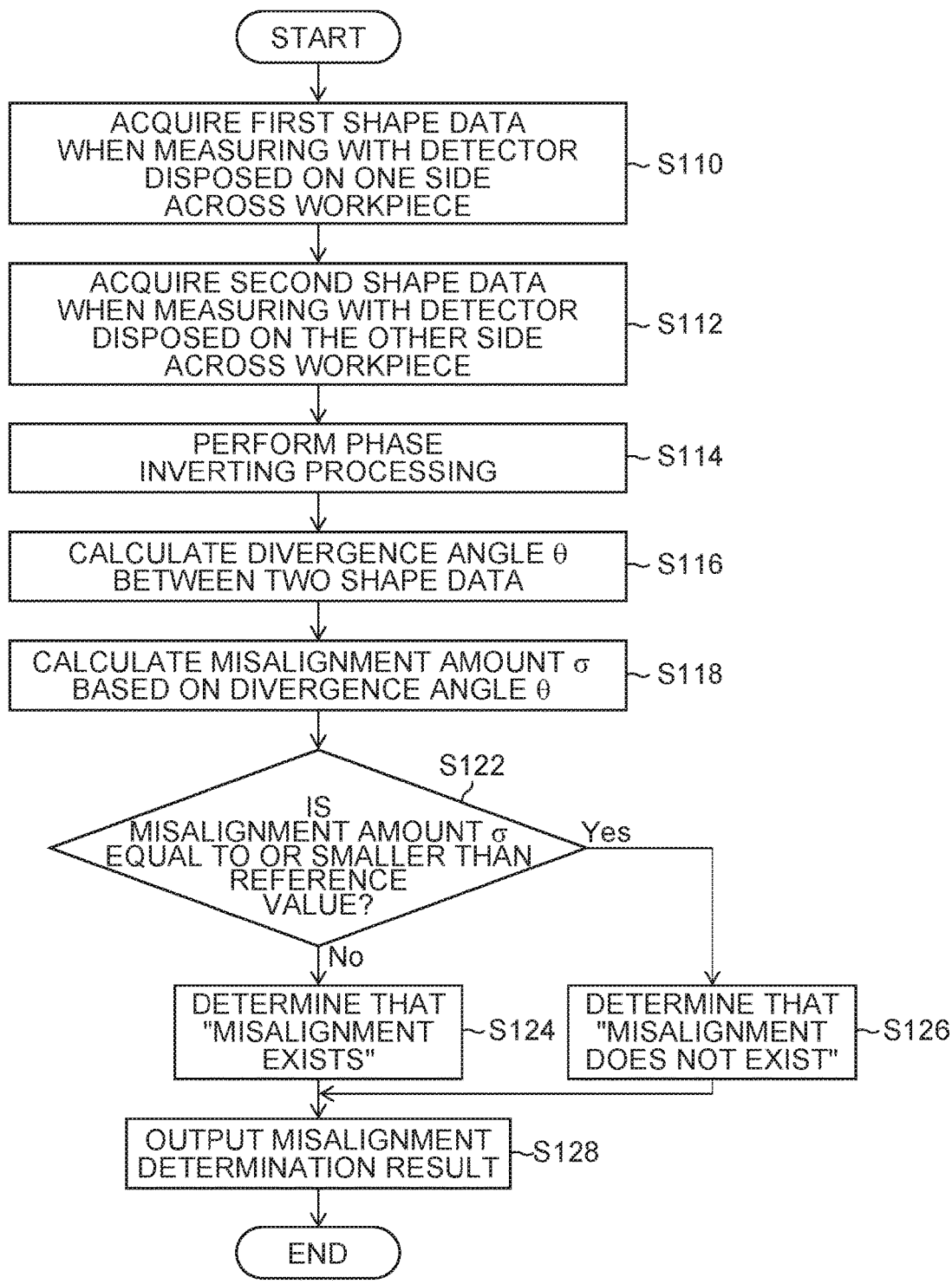
FIG. 16 is a flowchart showing another example of the misalignment amount calculating method using the roundness measuring device according to the second embodiment.

FIG. 16 is a flowchart showing another example of the misalignment amount calculating method using the roundness measuring device 100 according to the second embodiment. In FIG. 16, processes common to the processes shown in FIG. 11 are given the same reference characters, and their description is omitted.

In the misalignment amount calculating method shown in FIG. 16, after the misalignment amount σ is calculated (step S118), the calculation processing unit 134 functions as the misalignment determining unit 144 (see FIG. 8), and compares the misalignment amount σ and a preset reference value with each other to determine whether or not the misalignment amount σ is not more than the reference value (step S122). Then, when the misalignment amount σ exceeds the reference value (in the case of No), it is determined that "misalignment exists" (step S124). When the misalignment amount σ is not more than the reference value (in the case of Yes), it is determined that "misalignment does not exist" (step S126). After that, the calculation processing unit 134 outputs the determination result in step S124 or step S126 to the displaying unit 136 (step S128), and this flowchart is ended. Step S122, step S124 and step S126 are an example of the misalignment determining step.

According to the misalignment amount calculating method shown in FIG. 16, a user can simply judge measurement precision of the roundness measuring device 100. Accordingly, the user can improve measurement efficiency by setting the reference value in accordance with measurement precision required for the roundness measuring device 100 because confirmation and calibration operations which are not intrinsically needed can be eliminated when it is determined that "misalignment does not exist". Meanwhile, when it is determined that "misalignment exists", it possibly affects measurement precision, and hence, calibration processing of the misalignment amount σ, correction processing of the shape parameter indicating the surface shape of the workpiece W, and the like can be properly performed.

(Miscellaneous)

In the aforementioned embodiments, the type of the detectors 26 and 126 is not limited to a differential transformer system. Various detectors of contact and contactless types may be used as long as they can at least detect a displacement of the surface of the workpiece W. For example, a laser displacement sensor and the like may also be used.

Moreover, while in the aforementioned embodiments, cases where the diameter of the workpiece W is calculated are explained as an example of the shape parameter defining the surface shape of the workpiece W, the type of the shape parameter is not specially limited. A shape parameter other than the diameter of the workpiece W may be calculated.

Moreover, while in the aforementioned embodiments, cases where each of the first shape data A and the second shape data B is measurement data for one rotation of the workpiece W when measurement is performed at many measurement points (for example, 14400 points) during the one rotation are presented as preferred modes, cases are not limited to them. The first shape data A and the second shape data B may be measurement data obtained by measurement at some of those measurement points. For example, when the surface shape of teeth of a gear is evaluated, it may be possible to acquire only displacement data of the surface of tooth parts of the gear, excluding valley parts of the gear. That is, it is not necessarily needed to acquire measurement data for one rotation of the workpiece W continuously at many measurement points during the one rotation. Rather, it is preferable that the number, intervals and the like of measurement points be properly adjusted in accordance with the shape of the workpiece W to be measured and required measurement precision. Moreover, a range within which the measurement data is acquired (rotation range of the workpiece W) is not limited to one rotation. The range may be a partial range of one rotation.

Moreover, while in the aforementioned embodiments, cases where the present invention is applied to roundness measuring devices of table rotation type are described, the application of the present invention is not limited to these cases. The present invention can also be applied to roundness measuring devices of detector rotation type in which a detector rotates around a measuring object, which can achieve the similar effects.

As above, embodiments of the present invention have been described in detail. The present invention is not limited to the above examples, but in the nature of things, various modifications and alterations thereof may occur without departing from the spirit of the present invention.

REFERENCE SIGNS LIST

10 Roundness measuring device
12 Main body base
14 Rotary table
16 Motor
18 Column
20 Carriage
22 Arm
24 Detector holder
26 Detector
28 Probe
34 Calculation processing unit
38 First shape data acquiring unit
40 Second shape data acquiring unit
42 Shape parameter acquiring unit
44 Correction value calculating unit
46 Radial directional position calculating unit
48 Radial directional position correcting unit
50 Diameter calculating unit
60 Detector position detecting unit
62 Rotational angle detecting unit
100 Roundness measuring device
112 Base
114 Rotary table
116 Motor
118 Column
120 Carriage
122 Arm
124 Detector holder
126 Detector
128 Probe
134 Calculation processing unit
136 Displaying unit
138 First shape data acquiring unit
140 Second shape data acquiring unit
142 Misalignment amount calculating unit
144 Misalignment determining unit
M Measurement generating line

What is claimed is:

1. A surface shape measuring device which measures a surface shape of a workpiece by detecting a displacement of a probe being in contact with a surface of the workpiece with a detector while rotating the workpiece relatively to the detector around a rotational center, the device comprising:
a first measuring unit configured to measure a surface shape of the workpiece in a state where the detector is disposed at one of two positions across the workpiece, the two positions on a straight line which is parallel to a reference line passing through the rotational center and is shifted from the reference line;
a second measuring unit configured to measure the surface shape of the workpiece in a state where the detector is disposed at the other of the two positions; and
a shape parameter calculation unit configured to calculate a shape parameter defining the surface shape of the workpiece by collating the measurement result by the first measuring unit and the measurement result by the second measuring unit, wherein
the shape parameter calculation unit includes a detector deviation calculation unit configured to calculate a deviation of the detector from the reference line based on the collation result between the measurement result by the first measuring unit and the measurement result by the second measuring unit.

2. The surface shape measuring device according to claim 1, wherein the shape parameter is a diameter of the workpiece.

3. The surface shape measuring device according to claim 1, wherein the shape parameter is a roundness or a degree of cylindricity.

4. A surface shape measuring method of measuring a surface shape of a workpiece by detecting a displacement of a probe being in contact with a surface of the workpiece with a detector while rotating the workpiece relatively to the detector around a rotational center, the method comprising:
a first measuring step of measuring a surface shape of the workpiece in a state where the detector is disposed at one of two positions across the workpiece, the two positions on a straight line which is parallel to a reference line passing through the rotational center and is shifted from the reference line;
a second measuring step of measuring the surface shape of the workpiece in a state where the detector is disposed at the other of the two positions; and
a shape parameter calculation step of calculating a shape parameter defining the surface shape of the workpiece by collating the measurement result by the first measuring step and the measurement result by the second measuring step, wherein
the shape parameter calculation step includes a detector deviation calculation step of calculating a deviation of the detector from the reference line based on the collation result between the measurement result by the first measuring step and the measurement result by the second measuring step.

5. The surface shape measuring method according to claim 4, wherein the shape parameter is a diameter of the workpiece.

6. The surface shape measuring method according to claim 4, wherein the shape parameter is a roundness or a degree of cylindricity.

* * * * *